United States Patent [19]

Yamada et al.

[11] Patent Number: 5,223,905
[45] Date of Patent: Jun. 29, 1993

[54] AUTOMATIC DOCUMENT CONVEYING DEVICE

[75] Inventors: Yasushi Yamada; Kazuhiro Hirota; Akihiko Nishiki, all of Hachioji, Japan

[73] Assignee: Konica Corporation, Tokyo, Japan

[21] Appl. No.: 658,384

[22] Filed: Feb. 20, 1991

[30] Foreign Application Priority Data

Feb. 22, 1990 [JP] Japan .................................. 2-41615
Mar. 6, 1990 [JP] Japan .................................. 2-54252

[51] Int. Cl.$^5$ ............................................ G03G 21/00
[52] U.S. Cl. ..................................... 355/316; 271/3; 355/50; 355/75
[58] Field of Search ............... 355/75, 50, 51, 84, 355/309, 317, 321, 316, 233; 271/3, 3.1; 358/494

[56] References Cited

U.S. PATENT DOCUMENTS

| | | | |
|---|---|---|---|
| 3,936,041 | 2/1976 | Shiina et al. | 355/75 X |
| 4,440,387 | 4/1984 | Ikoma et al. | |
| 4,470,591 | 9/1984 | Acquaviva | 355/75 X |
| 4,896,876 | 1/1990 | Yamada et al. | 355/316 X |
| 4,921,239 | 5/1990 | Okui et al. | |
| 4,990,952 | 2/1991 | Watanabe | 355/50 |
| 4,998,133 | 3/1991 | Segawa | |

FOREIGN PATENT DOCUMENTS

| | | | |
|---|---|---|---|
| 54-43035 | 4/1979 | Japan | 355/75 |
| 60-82550 | 5/1985 | Japan | 355/309 |
| 61-32836 | 2/1986 | Japan | 355/75 |
| 1-226642 | 9/1989 | Japan | 271/3 |
| 1-236136 | 9/1989 | Japan | |
| 1-236137 | 9/1989 | Japan | 271/3 |

Primary Examiner—Fred L. Braun
Assistant Examiner—Shuk Y. Lee
Attorney, Agent, or Firm—Frishauf, Holtz, Goodman & Woodward

[57] ABSTRACT

An automatic document conveying device comprising a paper-feeder for sequentially separating one document sheet from a stack of document sheets loaded on a document loading table and for sequentially transporting each document sheet to a standby position upstream of an image exposure section and for halting each document sheet at the standby position, the standby position being variably determined by the length of each document sheet. A conveyor conveys each document sheet from the standby position to an exposure position on the image exposure section on a glass surface of the document loading table, each document is discharged after it is scanned and exposed by the image exposure section. The image exposure section is controlled to scan and expose a first document sheet, and a second document sheet is halted at the standby position while the first document is being scanned and exposed. The first document sheet is discharged after it has been scanned and exposed, and the second document sheet is conveyed from the standby position to the image exposure position when discharge of the first document begins. A third document sheet is then conveyed to the standby position at least before the scanning and exposure of the second document at the image exposure position is completed. The paper-feeder, conveyor and discharge device are operated until the entire stack of documents loaded on the document loading table is scanned and exposed.

2 Claims, 18 Drawing Sheets

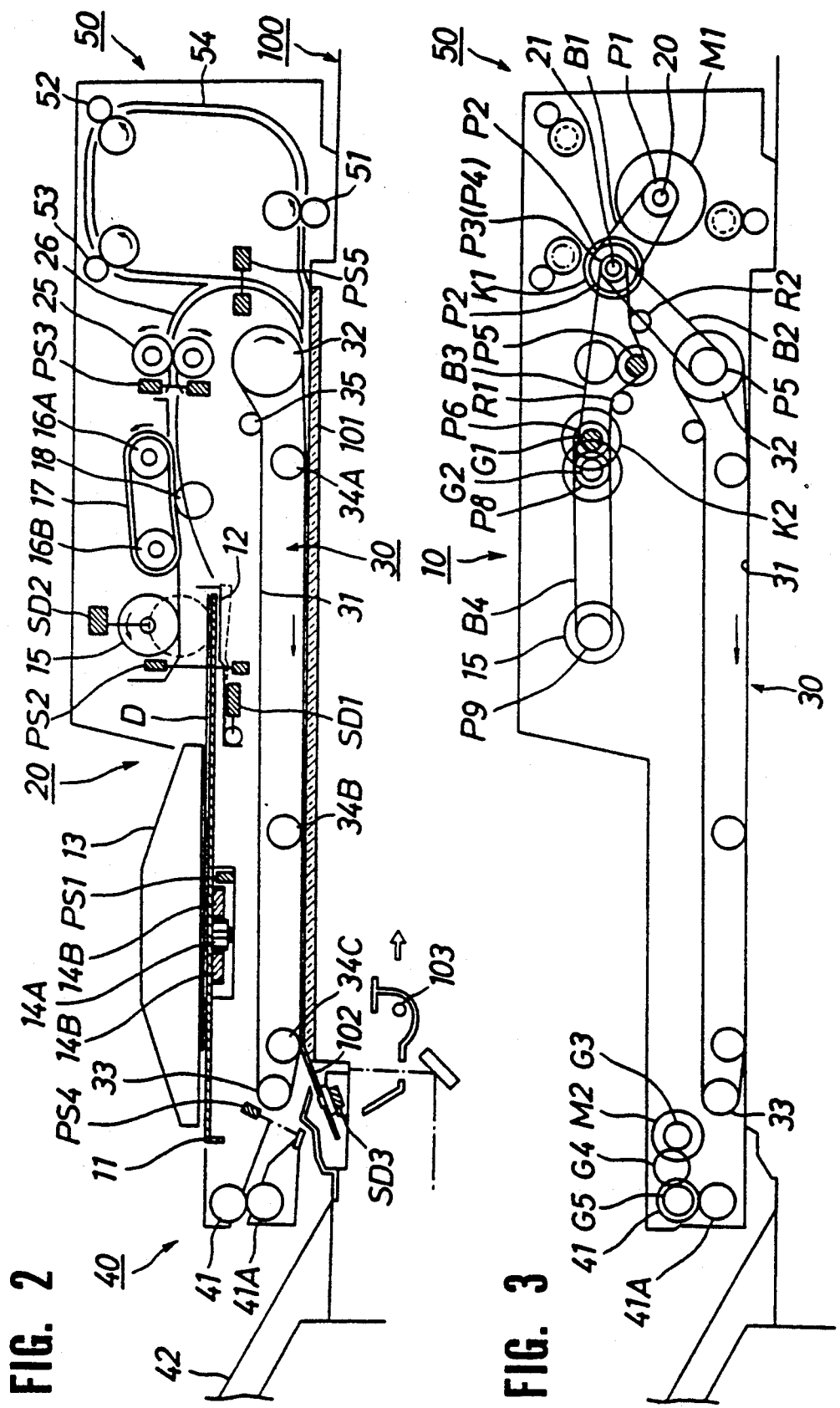

$v_1, v_1'$ --- HIGH SPEED CONVEYOR MODE  $v_1 \geqq v_2$  $v_3 \leqq v_1$ $v_2, v_2'$ --- LOW SPEED CONVEYOR MODE  $v_1' \geqq v_2'$

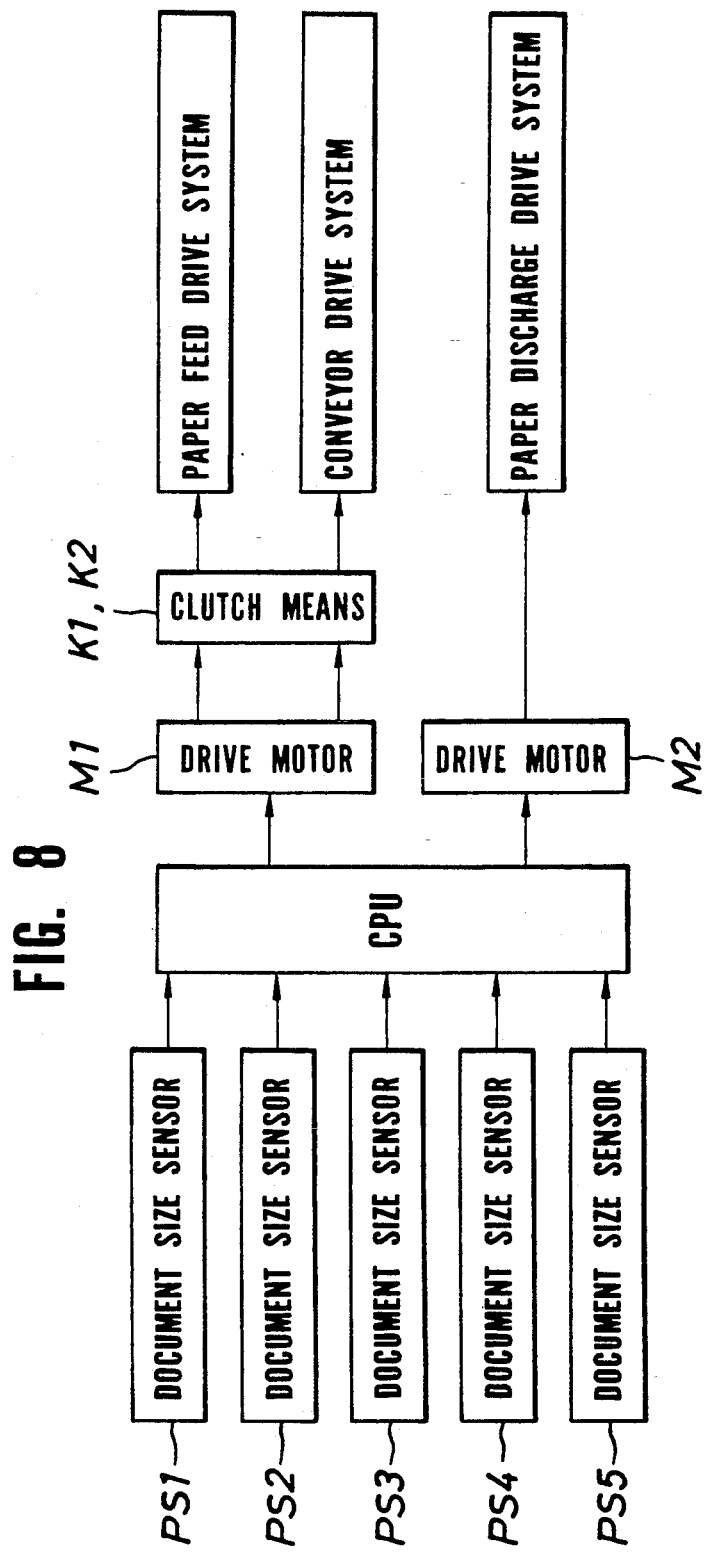

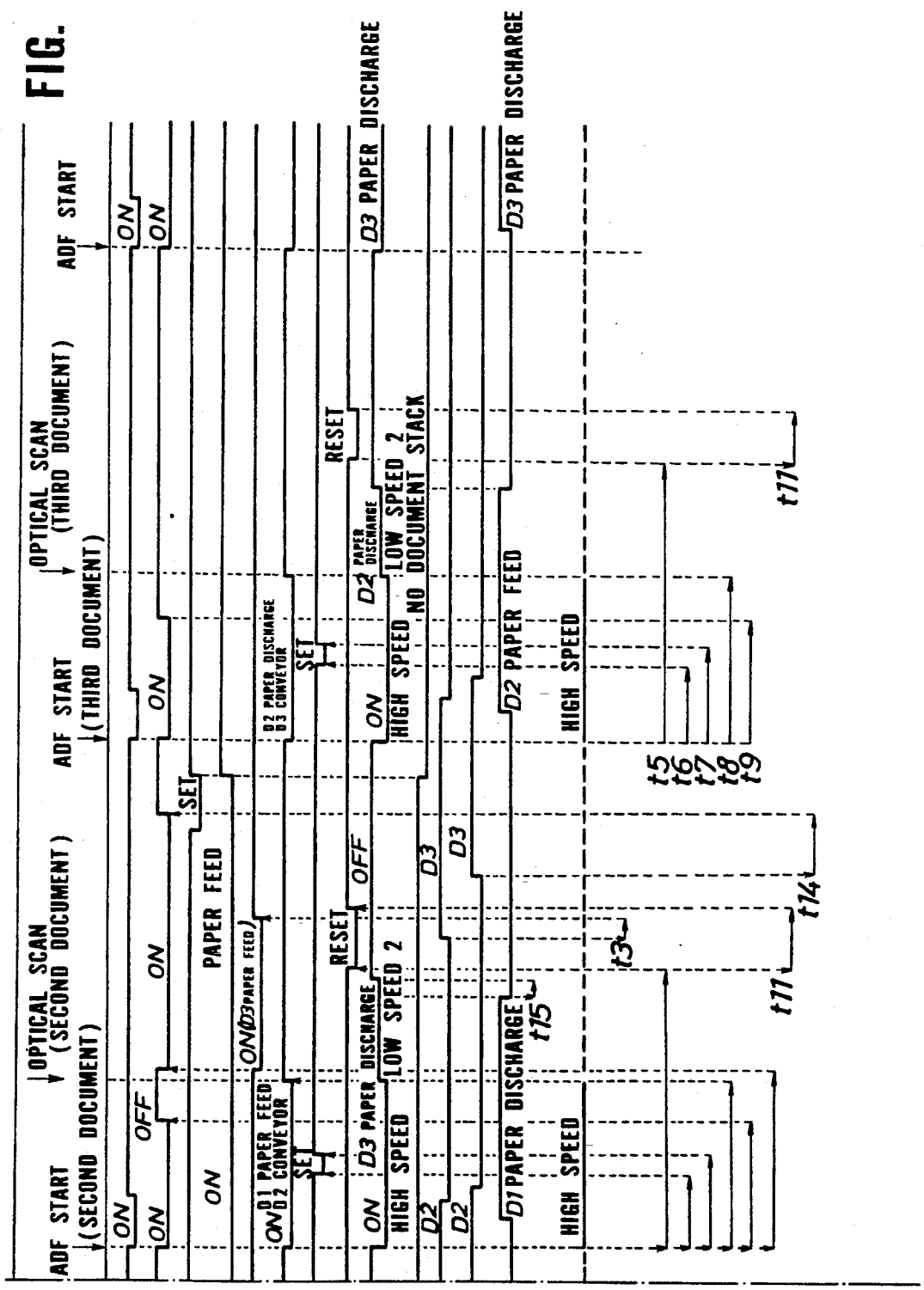

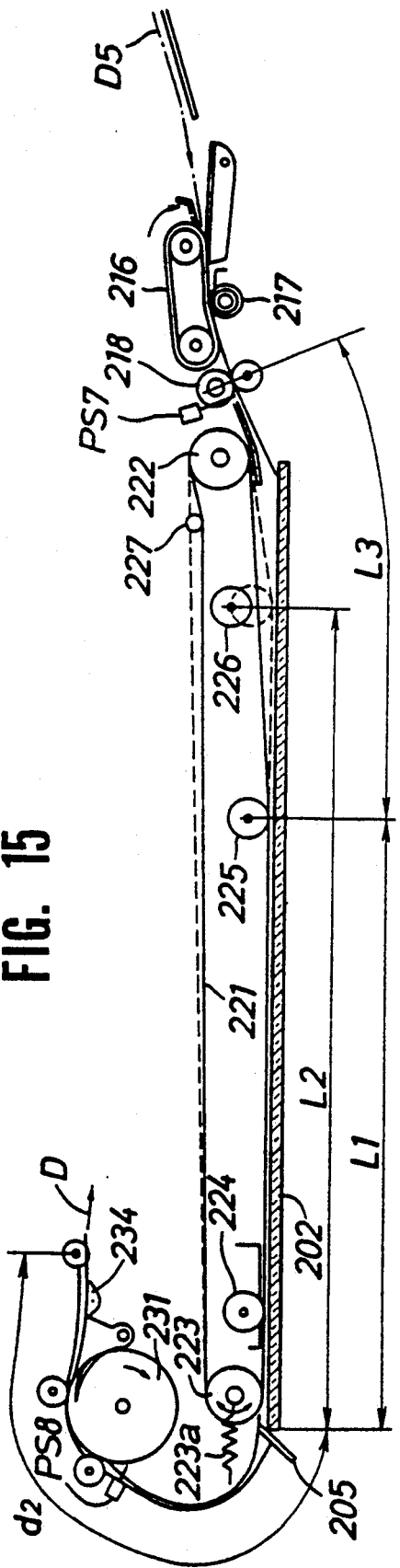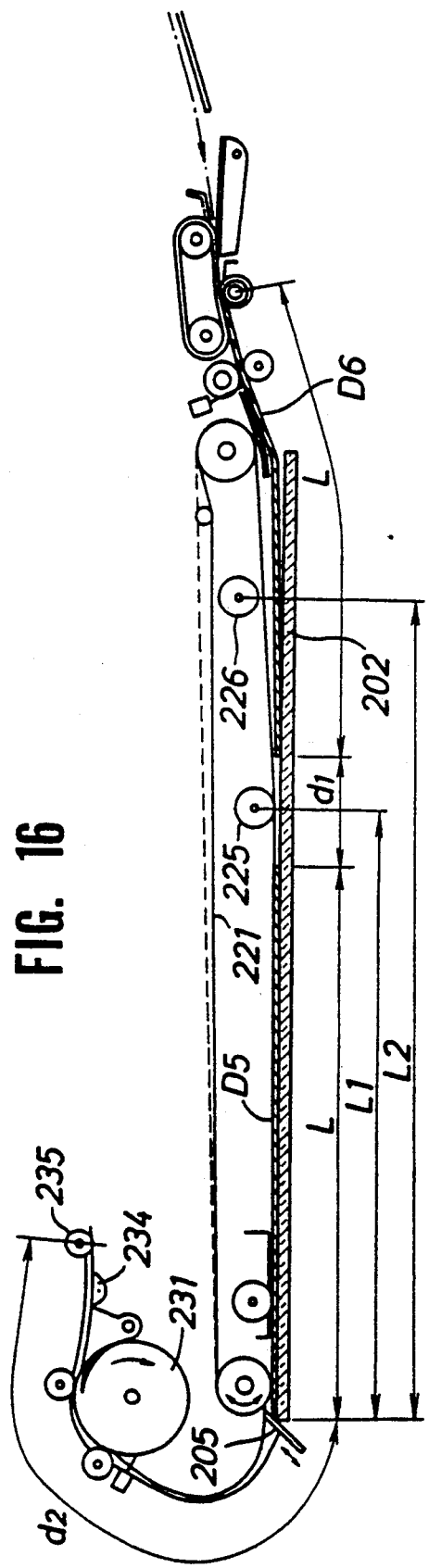

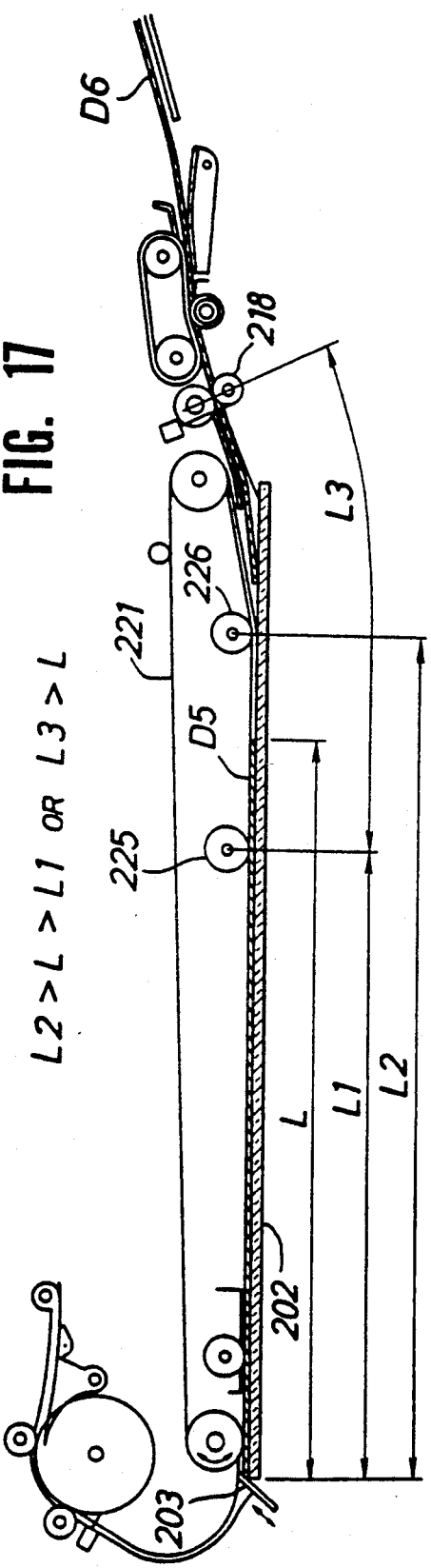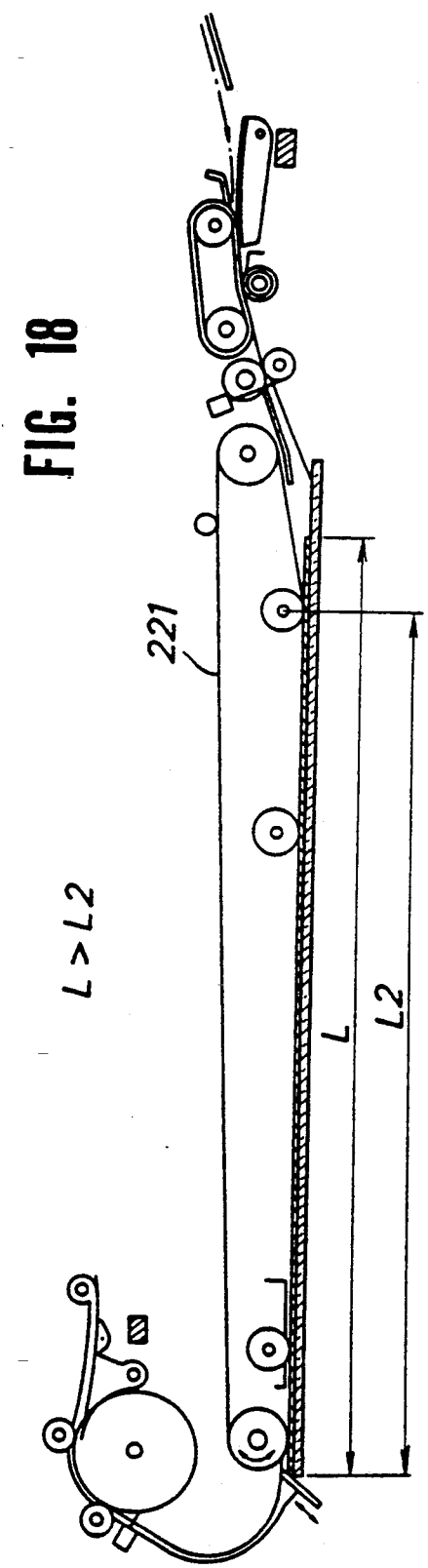

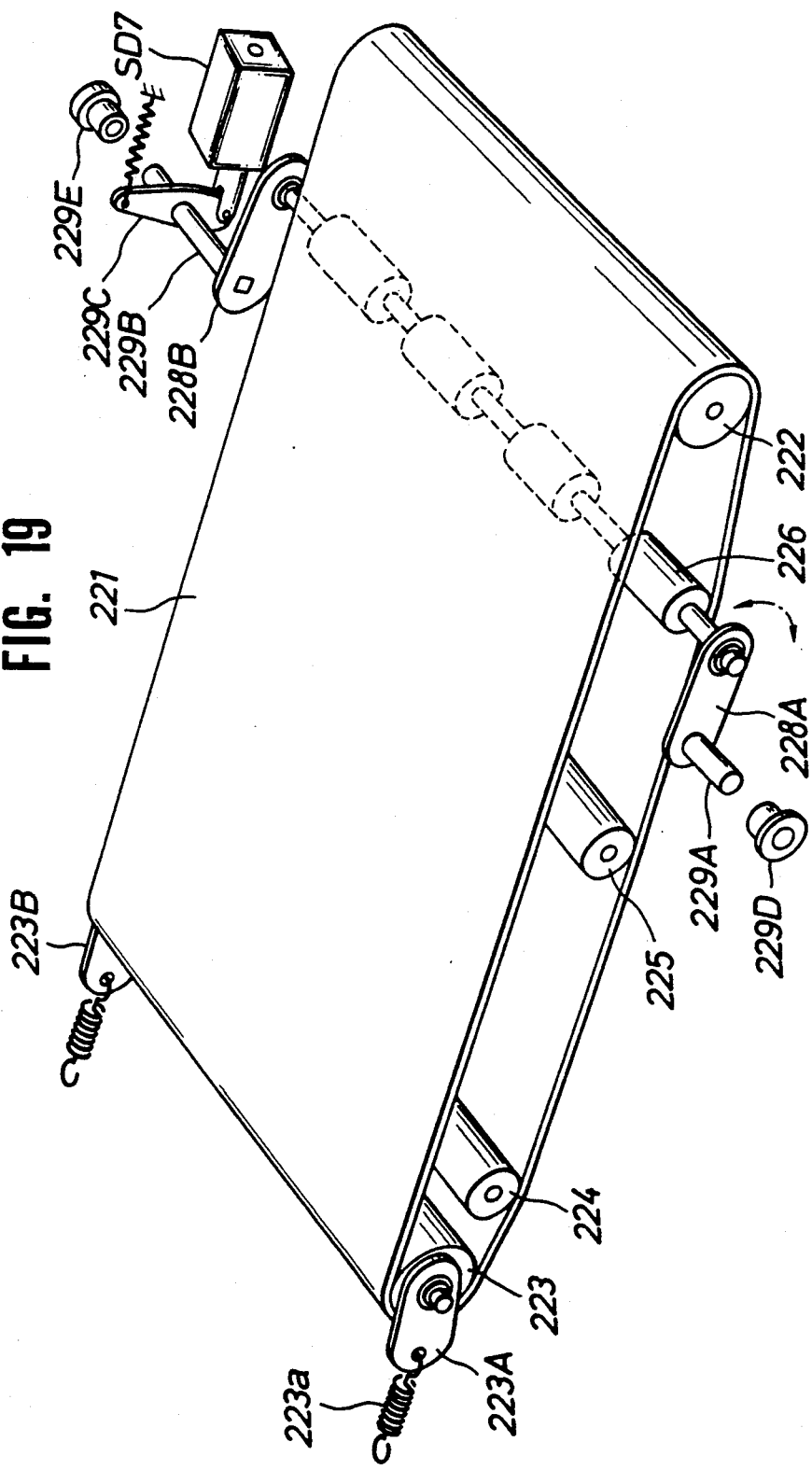

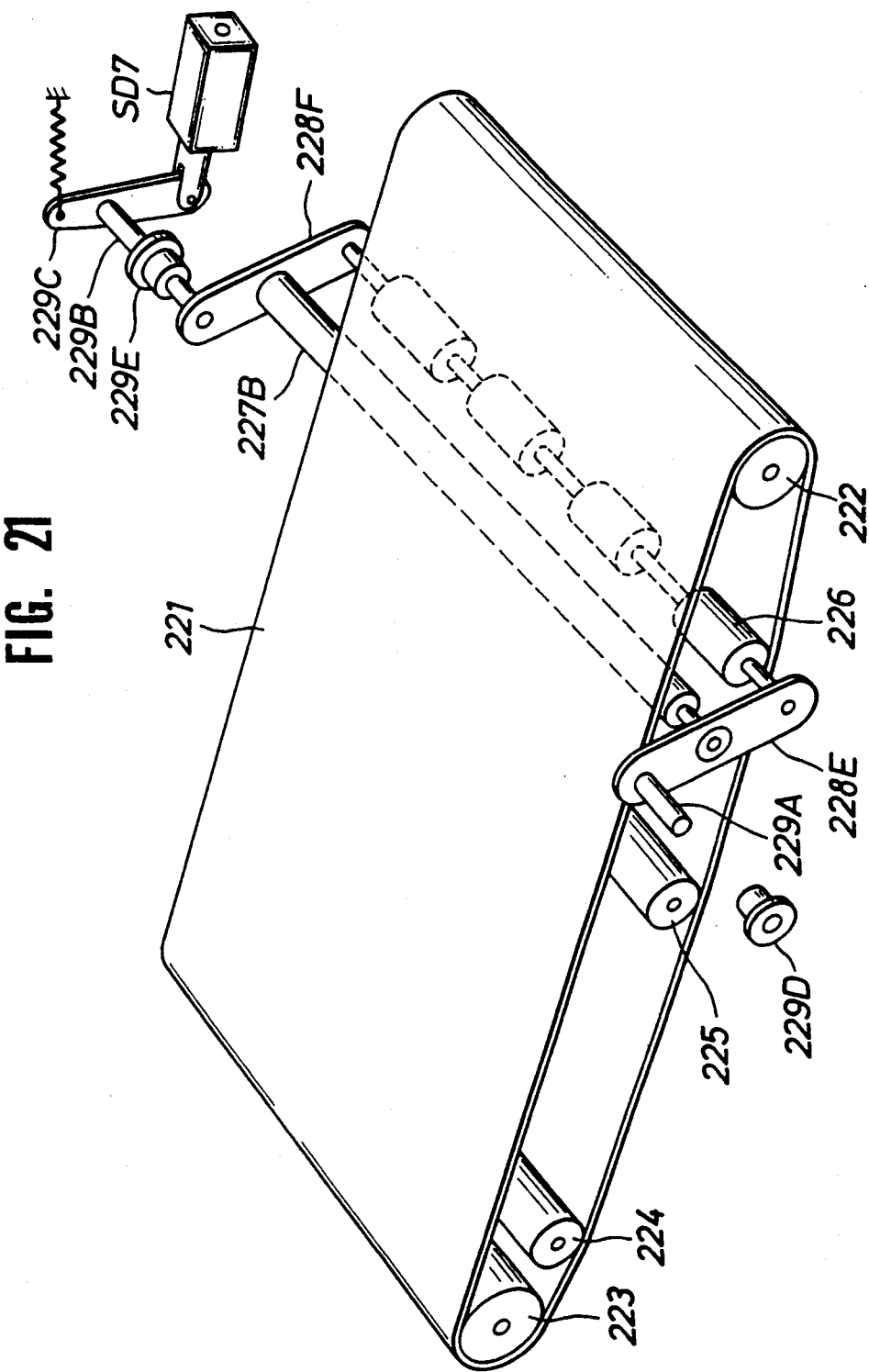

AUTOMATIC DOCUMENT CONVEYING DEVICE

BACKGROUND OF THE INVENTION

1. Field of the Invention

The present invention relates to an improved automatic document conveying device for use with a recording device, an image read out device, or the like in an electrophotographic copying machine.

2. Description of the Prior Art

Automatic document conveying devices are usually mounted on the document table glass (platen glass) of an image exposure section of a copying machine for use. In an optical movable-type copying machine on which this automatic document conveying device is mounted, documents in sheet form (hereinafter, simply document), of which one sheet at a time is removed from a document loading table (stacker section) on which the documents are loaded by means of an automatic document conveying device, are fed onto a document table glass by a conveyor belt. Here, after being exposed by a exposure lamp in the body of the copying machine, each document is discharged onto a document discharge table.

In a document change operation on the document table glass for this type of automatic document conveying device, conventionally the discharge of the document onto the document table is detected by a paper discharge sensor, after which the next document from the stack section is fed out, conveyed onto the document table glass, and halted at a specified position. Because of this considerable time is required to change documents, and accordingly, a long time is spent handling copies, so copy productivity drops.

During a document change operation in which a document is automatically fed to and removed from the document table using an automatic document feed device, if the document change is carried out within the time allowed for the scanner optical system to return, the copy productivity is 100% and there is no time wasted. However, the smaller the document becomes, the wider the gap from document to document, so there is a loss in conveying time.

For this reason, the document conveying speed from the document double feed prevention position in the stack section to the document stop position on the glass surface of the document table must be high.

However, running the document conveyor at high speed causes a large number of problems such as the necessity for a large motor, increased consumption of power, production of noise, increased wear on the conveyor belt, increased paper loss through damage, deterioration of document separation performance, and the like.

To eliminate these problems, conventional technology disclosed in Japanese Laid Open Patent Application 1-236136 provides a document conveying device with a short document change time.

In this document conveying device, a special feature is that, when the first document is conveyed to a specified position and halted at that position, the second document is conveyed to and stopped at a position which is not upstream on the plate, separated from the specified position. Next, when the first document after the complition of the exposure process is at a position from which it can be conveyed by the conveying means to a downstream position on the platen separated from the specified position, at the same time, the second document is conveyed to a specified position and halted at that position. This procedure is repeated with the third and subsequent documents which are conveyed and halted in succession.

However, this document conveying process has the drawback that three documents are conveyed simultaneously, so that the motor load increases, and a large current is necessary. In addition, because three documents are moving simultaneously, if a jam occurs, the next document overtakes the preceeding document from the rear so that there is the possibility of damage occurring to the documents. The margin for jam detection is small and jam handling is also complicated.

Also, in the above example, the gap between the rear end of the first document on the platen and the front end of the second document on the supply path is large, so the travel distance of the documents during document change increases, and accordingly, the time required for document change increases, which is a drawback.

In order to improve these drawbacks, the front end of the next document is conveyed as far as the contact nip position between the conveyor belt on the platen glass and the platen glass itself and made to standby at that point. However, the contact position of the conveyor belt is determined by the position of a document presser roller which applies pressure to the conveyor belt on the platen glass surface from the underside of the pressure belt, and the front end of the document does not come close to the preceding document.

SUMMARY OF THE INVENTION

A first object of the present invention is to provide, with due consideration to the drawbacks of such conventional devices, an improved automatic document conveying device wherein the number of documents copied is increased.

This object is achieved in the present invention by the provision of an automatic document conveying device wherein one sheet at a time is separated from a stack of documents loaded on a document loading table and transported to a sequential image exposure section, the document is halted at the image exposure section, scanning and exposure are performed by a moving optical system, then, after exposure the document is conveyed to a document discharge table. The automatic document conveying device of the present invention comprises a paper feed means which feeds the document to the image exposure section, a conveyor means which conveys each document to a specified position on the image exposure section and halts at that specified position, a paper discharge means which discharges the exposed document, and a control means for driving and controlling the other means. Through the action of the abovementioned paper feed means, conveyor means, paper discharge means, and control means, a first document from the loading table is conveyed by the conveyor means to a specified position on the image exposure section and halted, and while a specified number of copies are being scanned and exposed, the next document is conveyed to a position downstream from the document loading table and upstream from the document being scanned and exposed, and a standby action is completed. Next, the discharge of the first document, on which scanning has been completed in the exposure section, begins, and the second document, which is on standby, is conveyed to a specified position for exposure, and then halted. When the standby position is set at a position where the length of the documents conveyed from the standby position to the specified exposure position is less than the conveyed length of the scanned documents discharged at the specified position, then, at least before the first scanning and exposure is completed, the discharge of the first document in the process of being discharged is completed, and before the scanning of the set number of documents is completed, the third document is conveyed and halted at the standby position. These actions are subsequently repeated.

Also, the automatic document conveying device of the present invention is provided with a detection means which determines the document size in the paper feed device. Based on a document size detection signal detected by the document detection means, the document is conveyed by the conveyor means to a specified position at the image exposure section. While the preceding document, on which the specified number of scanning and exposure operations has been carried out, is halted, the next document is conveyed to a specified standby position upstream from the previous document and put on standby. The pressing roller is driven, and the conveyor belt is controlled so that the conveyor belt is pressed against or moved away from the document table glass surface.

A feature of the drive control of the pressure roller of the automatic document conveying device of the present invention is that the pressure roller is activated when the front end of the next document in the standby position for the image exposure section is selected on the conveyor downstream side from the pressure position of the pressure roller, and separation of the documents occurs in the direction where a large gap is created between the document table glass and the conveyor belt close to the pressure position.

In addition, the automatic document conveying device of the present invention is constructed so that:

(1) a document feed opening and a document discharge opening are provided in different directions on the document table glass;

(2) paper feed and paper discharge are concluded during image exposure;

(3) the leading edge of the next document supplied during image exposure is held on standby on the upstream side from the conveyor belt pressure position close to the end section on the document table glass surface; and (4) the discharge action of the previous document is completed during exposure.

BRIEF DESCRIPTION OF ACCOMPANYING DRAWINGS

These and other objects, features, and advantages of the present invention will become more apparent from the following description of the preferred embodiments taken in conjunction with the accompanying drawings, in which:

FIG. 2 is a configuration diagram showing the conveying path of the document.

FIG. 3 is a configuration diagram showing a drive system (power transmission system) for the automatic document conveying device.

Figure 6A:
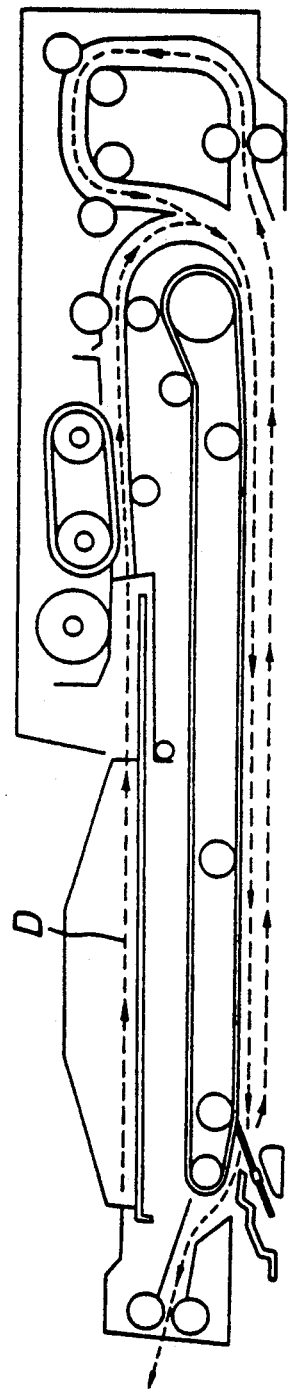
Figure 6B:
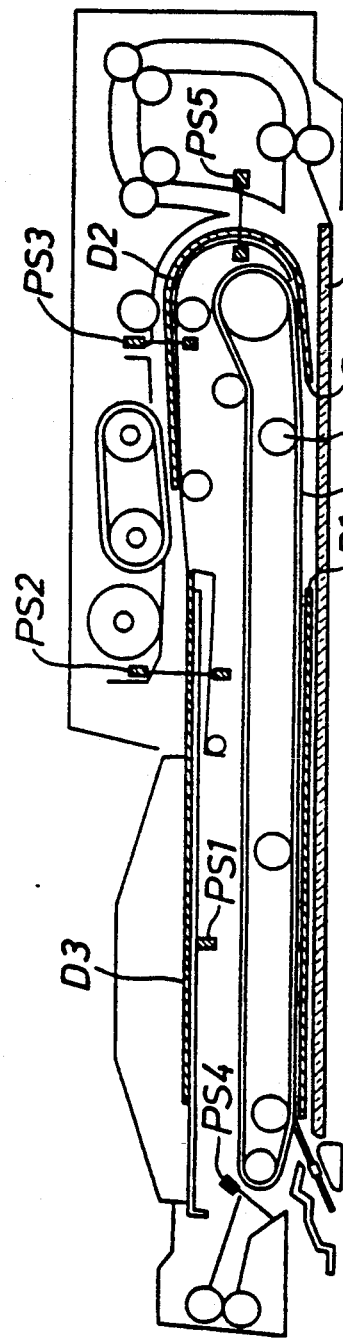
Figure 6C:
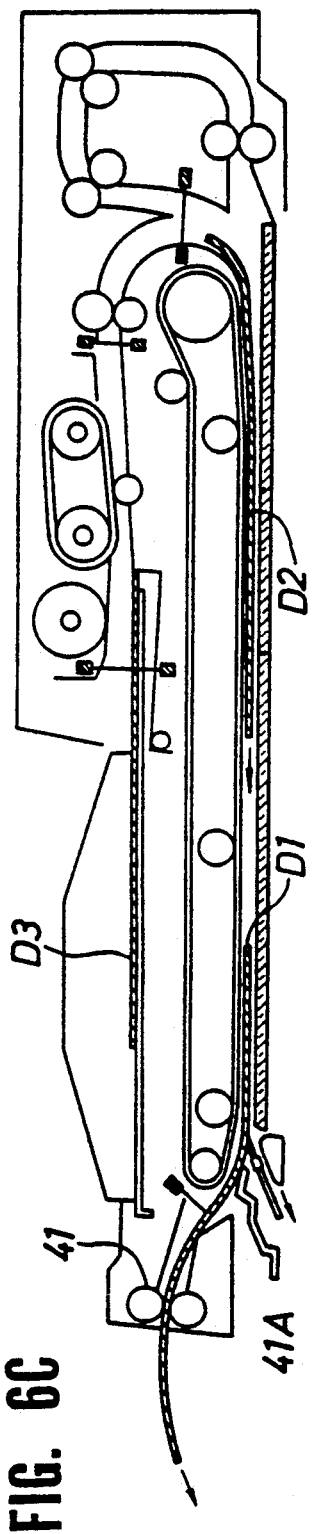

FIG. 6A, FIG. 6B, and FIG. 6C are transverse views illustrating the document conveying process.

Figure 7:
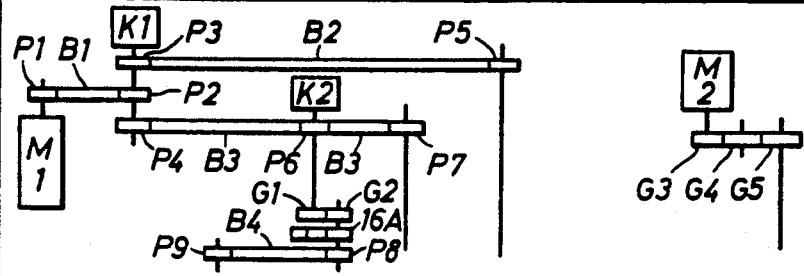

FIG. 7 is a view showing the rotational speed of each paper feed roller from the drive system.

FIG. 8 is a block diagram of the drive system.

Figure 9A:
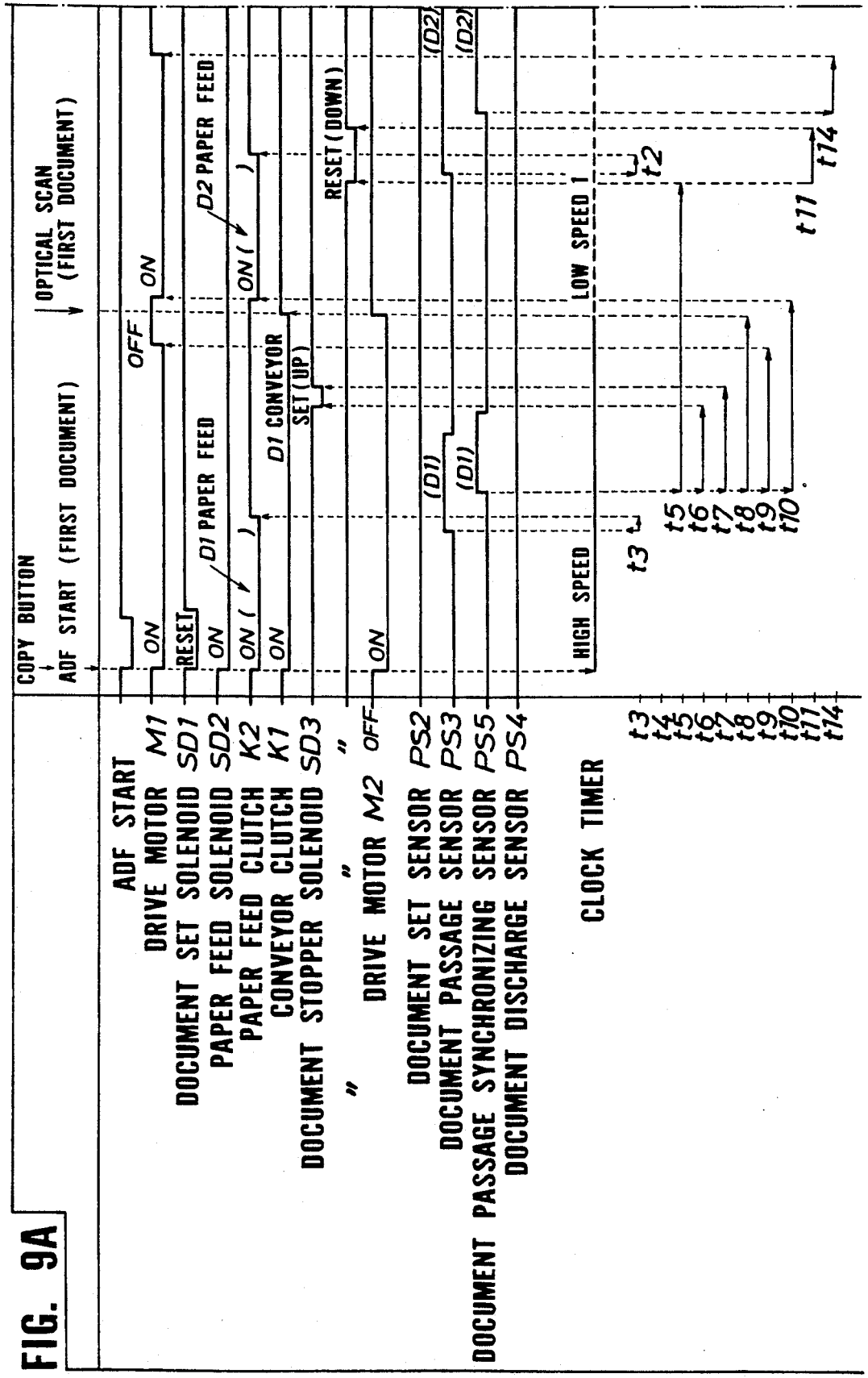

FIG. 9A and FIG. 9b together show a time chart for the document feed conveying process.

Figure 10:
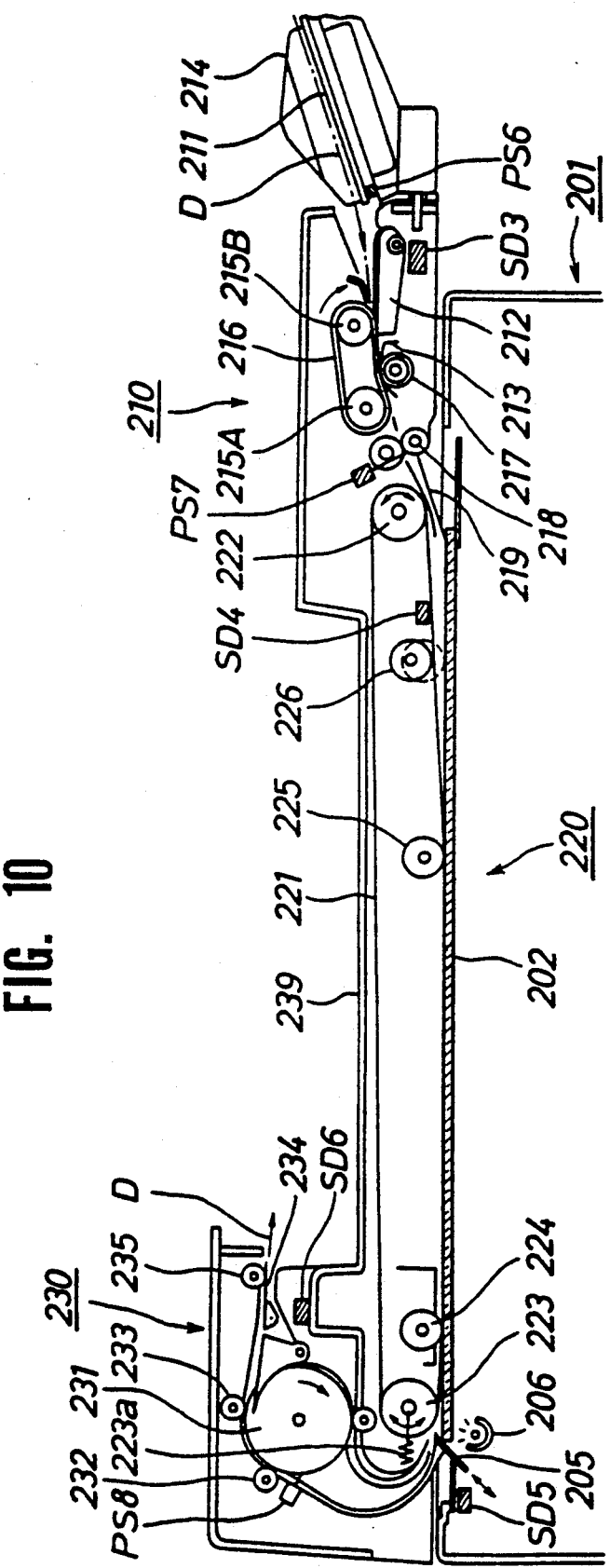

FIG. 10 is a configuration diagram showing the conveying path of the document for another embodiment of the automatic document conveying device of the present invention.

Figure 11:
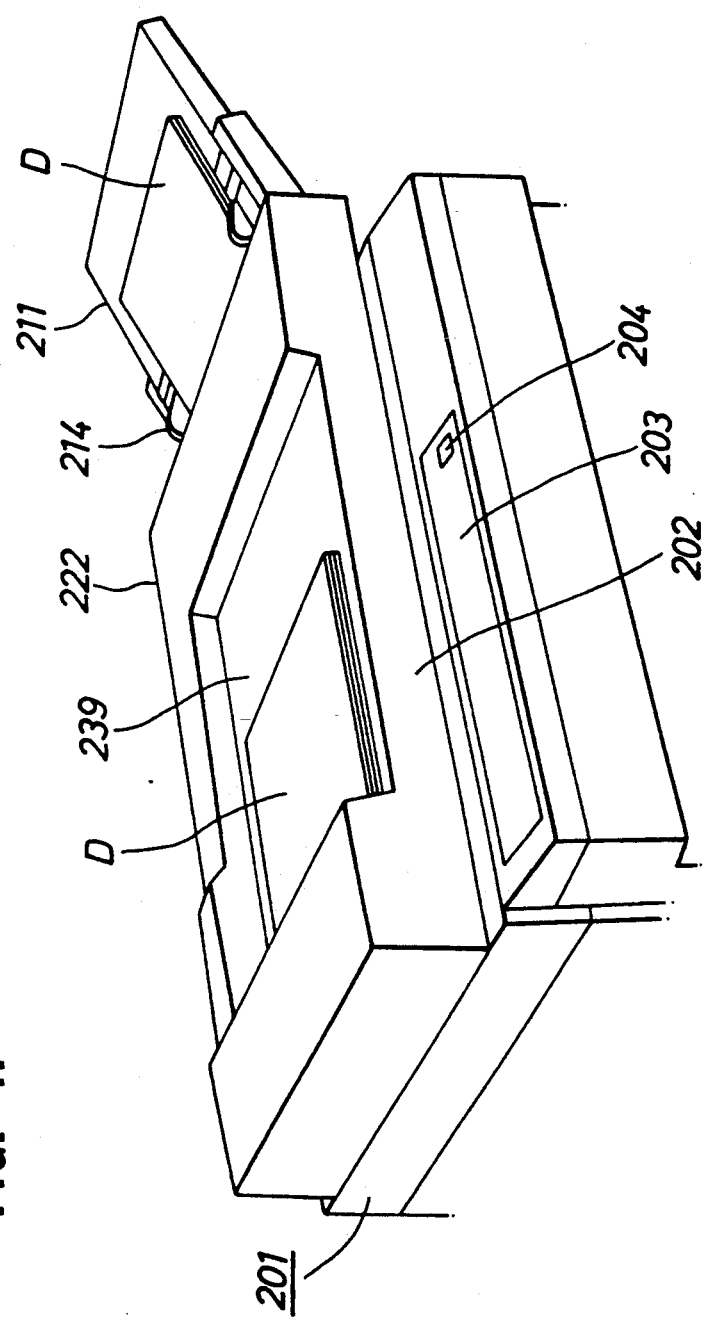

FIG. 11 is an external perspective view of the automatic document conveying device mounted on the main body of a photocopying machine.

Figure 12:
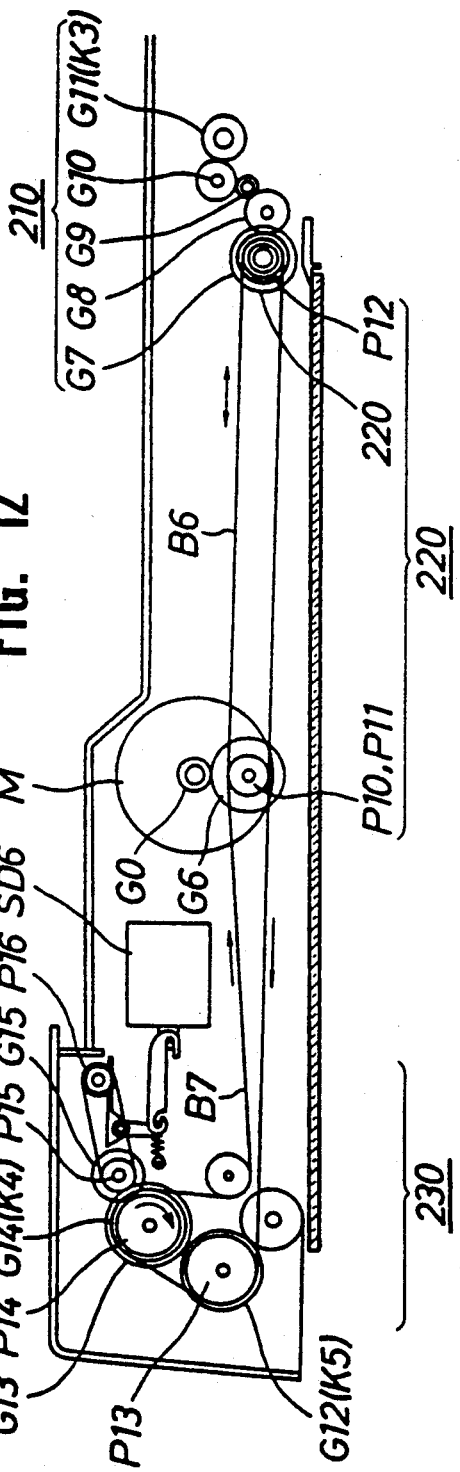

FIG. 12 is a configuration diagram showing the drive system (power transmission system) for the automatic document conveying device.

Figure 13:
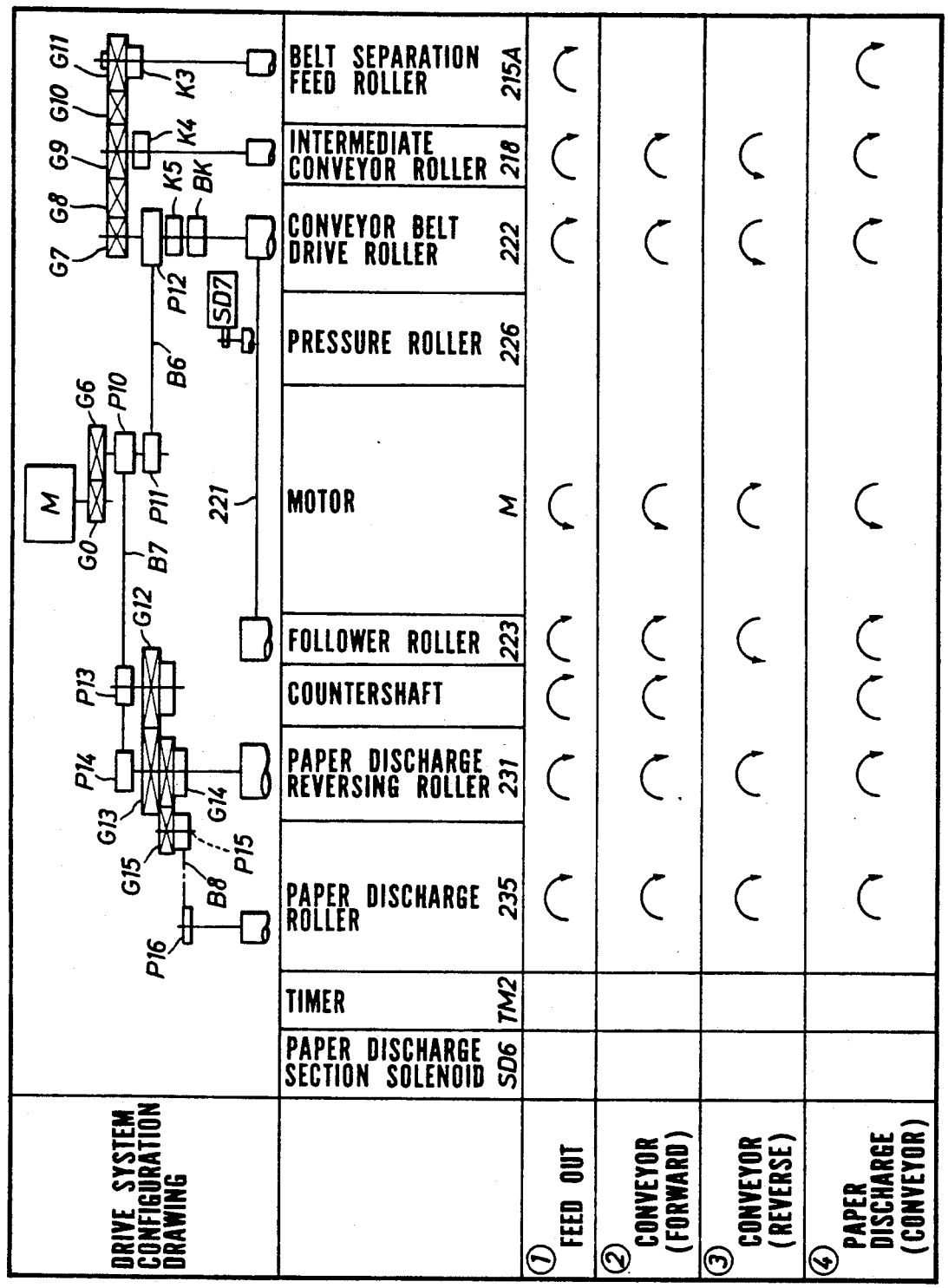

FIG. 13 is a transverse view of the overall drive system configuration of the device.

Figure 14:
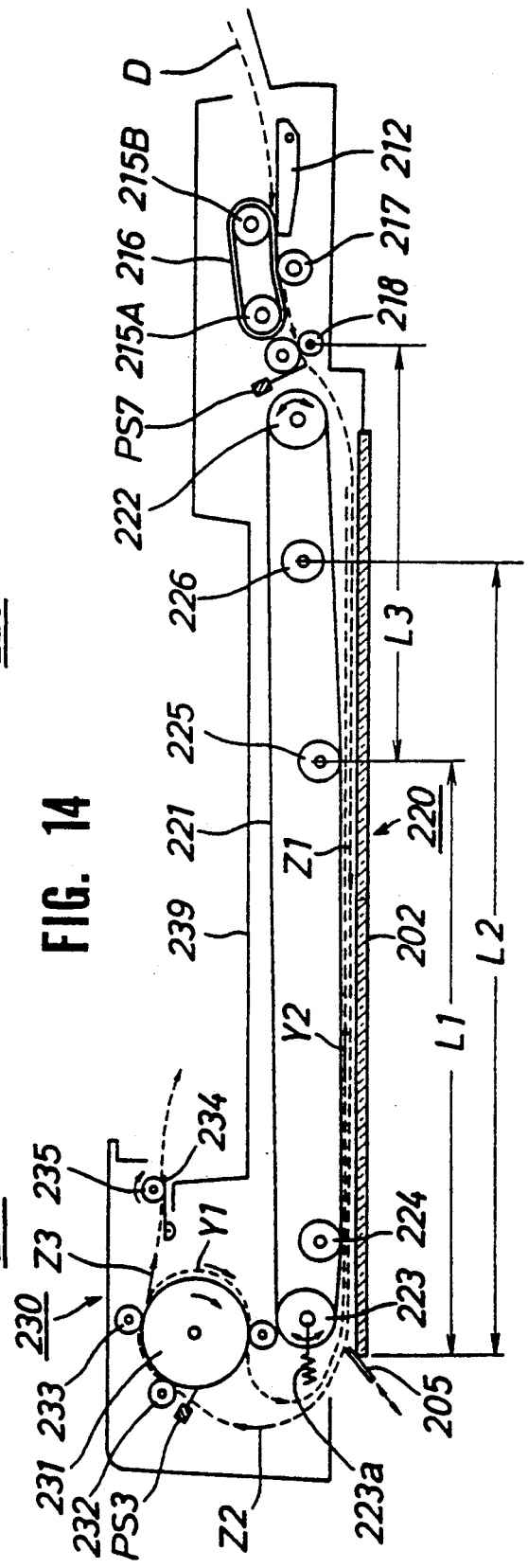

FIG. 14 is a transverse view of the conveying path of the document when both sides of the document are being copied.

FIG. 15 is a transverse view which explains the positional distances between the main document conveying members of the automatic document conveying device.

FIG. 16, FIG. 17, and FIG. 18 are transverse views showing the processes for conveying each size of document.

Figure 20:
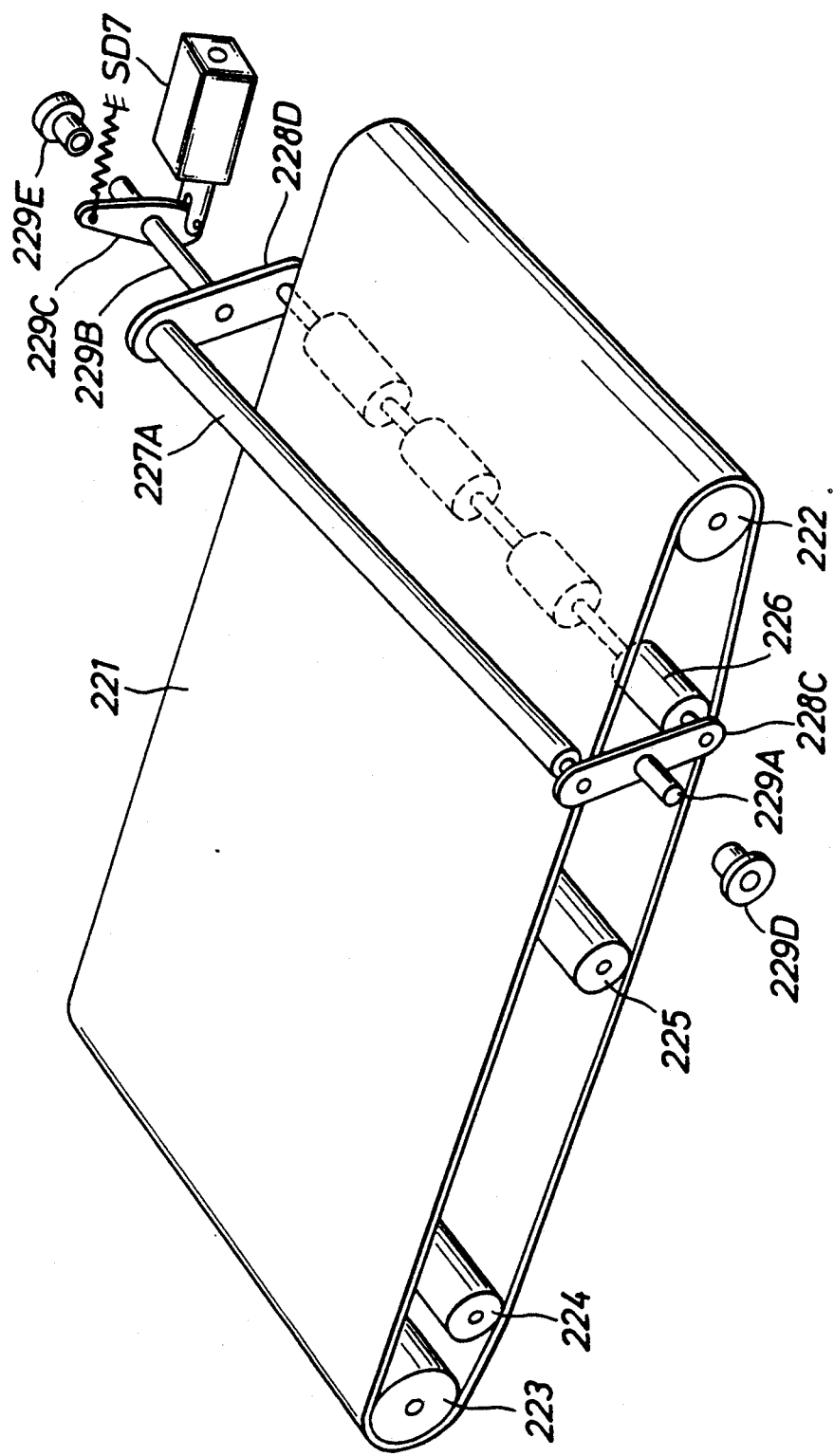

FIG. 19, FIG. 20, and FIG. 21 are perspective views showing other embodiments of the drive device of a movable pressure roller of the invention.

DETAILED DESCRIPTION OF THE PREFERRED EMBODIMENTS

The details of the present invention will now be explained based on drawings of embodiments of the present invention.

Figure 1:
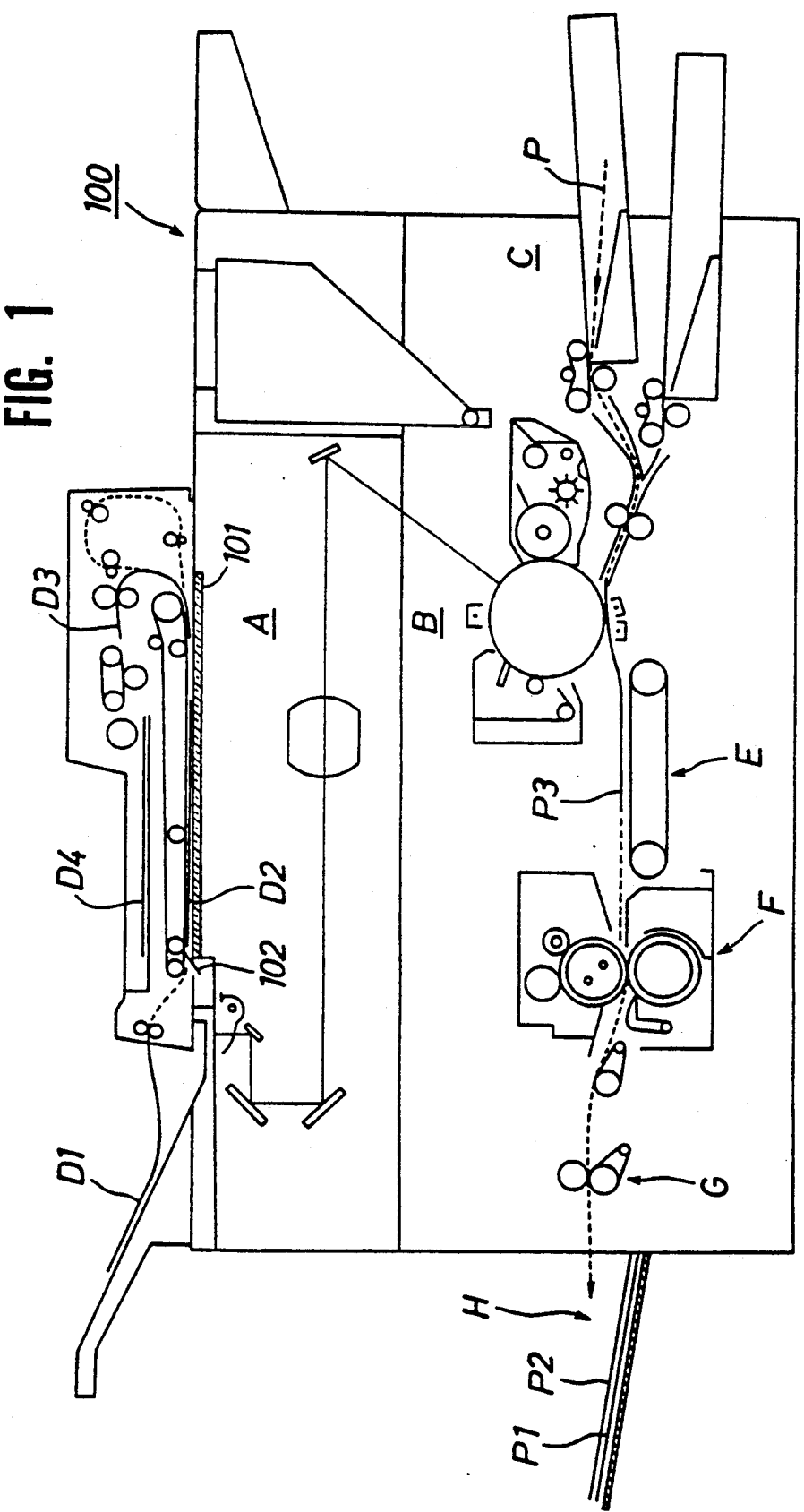
FIG. 1 is a configuration diagram of an image forming device provided on a first embodiment of an automatic document conveying device of the present invention.

Now referring to FIG. 1, this configuration diagram illustrates an image forming device (for example, an electrophotographic copying machine) provided with an automatic document conveying device of the present invention. A main copying machine 100 comprises a scanning and exposure section A, an image forming section B, a paper feed section C, a conveyor section E, a fixing section F, a paper discharge section G, and a discharge paper tray H. The broken line in the drawing indicates the conveying path of a paper P.

FIG. 2 is a configuration diagram showing the document conveying path of the automatic document conveying device, which freely swings open and closed, on the upper surface of the main copying machine 100. FIG. 3 is a configuration diagram showing a drive system (power transmission system) for the automatic document conveying device, FIG. 4 a perspective view of the document conveying system and the drive system within the device, and FIG. 5 a plan view of the main elements of the device. FIG. 6A is a transverse view illustrating the document conveying process. The device illustrated in these drawings is an automatic document conveying device with a document reversing function (RADF).

Figure 4:
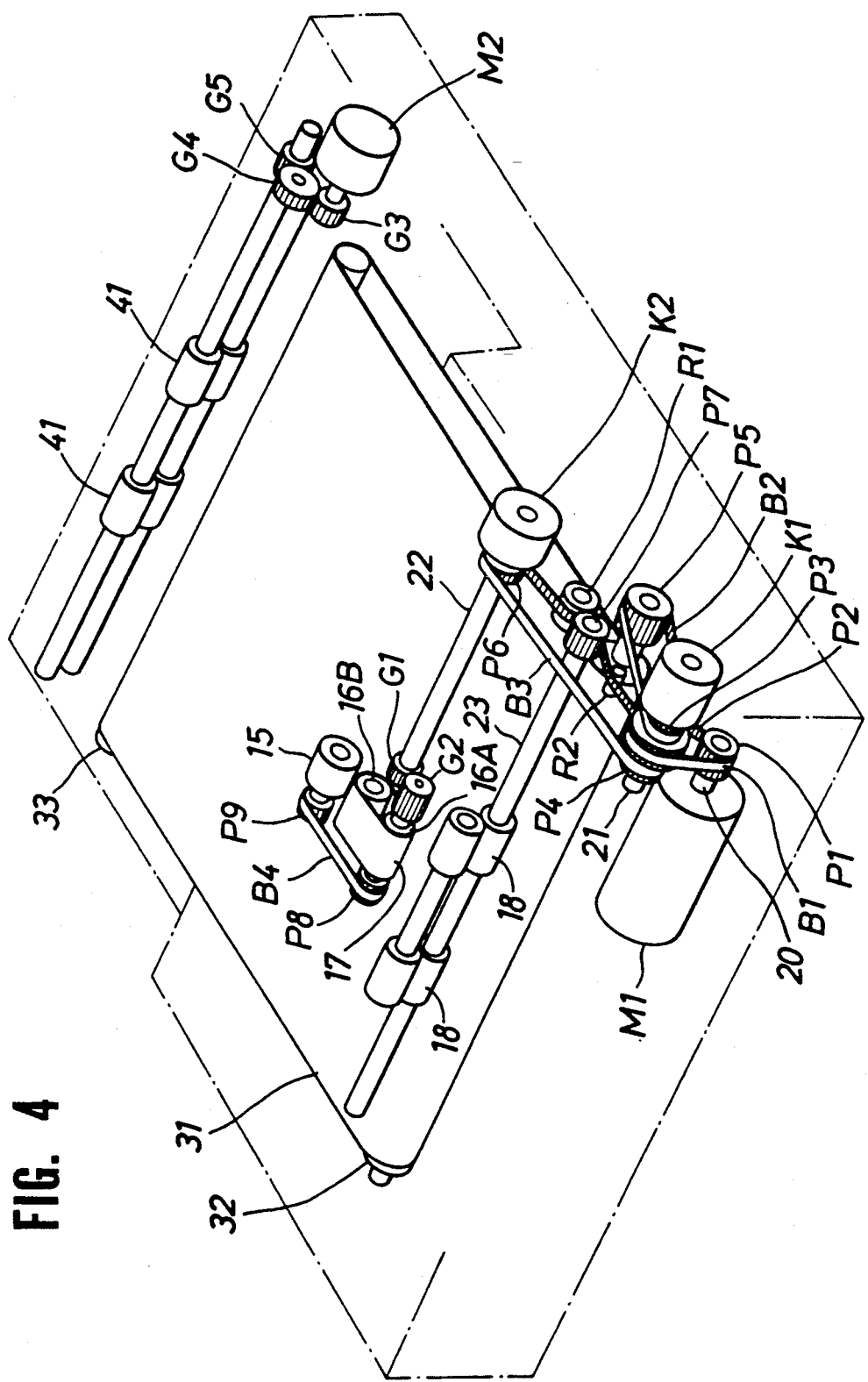
FIG. 4 is a perspective view of the document conveying system and the drive system within the device of the present invention.

The structure and operation of the automatic document conveying device will first be explained with reference to FIG. 2, FIG. 4, and FIG. 6A.

A document loading table 11 for loading stacks of documents is provided on the left side of the upper surface of a paper feed section 10 of the automatic document conveying device. A document set solenoid SD1 and a document front end stopper 12 which can be swung by means of the document set solenoid SD1 are provided on the lower side of the front end section of the document loading table 11. The upper end section of the stopper 12 projects close to the front end section of the document loading table 11. The stack of documents is loaded on the document loading table 11 and the front end section of the stack of documents contacts the document front end stopper 12 where the front ends of the papers are aligned.

When the stack of documents is loaded onto the document loading table 11, the presence of the documents on the document loading table is detected by a document set sensor (a sensor which determines when the number of documents is zero) PS2, and the ADF mode is indicated on the control panel on the main copying machine 100.

A pair of width regulation plates 13, 13 for regulating the documents in the direction of their width is provided on the document loading table 11. The width regulation plates 13, 13 on the lower surface of the document loading table 11 are connected to a pair of rack gears 14B, 14B which can slide transversely in opposite directions, between which a pinion gear 14A is interposed, and the plates 13, 13 can be moved symmetrically with respect to the center. The rack gears 14B, 14B are connected to the respective width regulation plates 13, 13. The width of the document can be read out from the amount of movement determined by a size sensor PS1. From this read-out value, the length of a standard sized document D is automatically calculated. Accordingly, the stack of documents is loaded on the document loading table 11, and by sliding the width regulation plates 13, 13 to contact the sides of the documents, each type of document size, specifically, each manuscript length, can be recorded.

On the upper part of the document loading table 11 close to the front end, a pick-up roller 15 is moved vertically by the action of a paper feed solenoid (latch-type) SD2 and spring pressure, and can be rotated by a drive motor M1. The automatic document conveying device is driven by operating the COPY button on the control panel of the copying machine 100, to apply power to the paper feed solenoid SD2. The pick-up roller 15 connected to the paper feed solenoid SD2 is caused to descend and press against the uppermost surface of the stack of documents, and at the same time the drive motor M1 starts and causes the documents to be sent forward.

On the document feed downstream side of the pick-up roller 15, a paper feed separating means is provided, comprising a feed belt 17, which runs around a feed roller 16A and a follower roller 16B, and a double-feed prevention roller 18 positioned below the feed belt 17. The power from the drive motor M1 is transmitted to this paper feed separating means through a magnetic clutch K2, and one document only, —the document in the uppermost position among the many sheets of documents sent out from the pick-up roller 15— is separated and sent forward.

A document passage sensor PS3, a intermediate conveyor roller 25, and a curved guide plate 26 are provided on the document feed downstream side of the paper feed separating means.

The passage of the front end of one document sheet sent out by the paper feed separating means is detected by the document passage sensor PS3, and this document is then fed between the guide plates 26 by the adjacent pair of intermediate conveying rolls 25. A document passage synchronizing sensor (reversed document passage sensor) PS5 positioned in the middle of the feed path generates a detection signal when the front end of the document passes, to control the conveying of the document. The document passage synchronized sensor PS5 controls the operation of a later discussed document stopper 102, the drive motor M1, the paper feed clutch K2, the conveyor clutch K1, and the like, through a clock timer.

Next, the document is interposed between a conveyor belt 31 which can move either forward or backward, and a document table glass for image exposure (hereinafter, document table glass) 101 on the upper surface of the main copying machine 100, and is conveyed in a conveying section 30. The document is halted by the action of a document stop solenoid (latch-type) SD3 at a position where its forward end section contacts a document stopper 102 projecting from the upper left end surface of the document table glass 101.

The conveyor belt 31 passes over a conveyor belt drive roller 32, a follower roller 33, three document presser rollers 34A, 34B, 34C, and under a tension roller 35.

The document D in the halt position on the document table glass 101 is exposed by means of a exposure lamp 103 in the main copying machine 100, and a document image is formed on a recording member by scanning with a scanning exposure section A comprising a lens, mirrors, and the like.

Then, the exposure is repeated in the same way with one sheet only of a set copy, and when the processing of a series of copies of the document is completed, the projecting section of the document stopper 102 is removed from the upper surface of the document table glass 101, to release the front end of the manuscript. Then, the conveyor belt 31 once again begins to move, along with a pair of discharge rollers 41, and the manuscript is discharged. The passage of the rear end of the document is detected by means of a document discharge sensor PS4, after which the document is discharged and loaded onto a discharge tray (document discharge table) 42.

The automatic document conveying device is also provided with a document reversal section 50 for reversing turning the documents over a document reversal path. A plurality of conveying rollers 51, 52, 53, a guide plate 54, and a reversed document passage sensor PS5 for detecting a document passing through the inside of the document reversal section 50 are positioned in the document reversal section 50.

Figure 5:
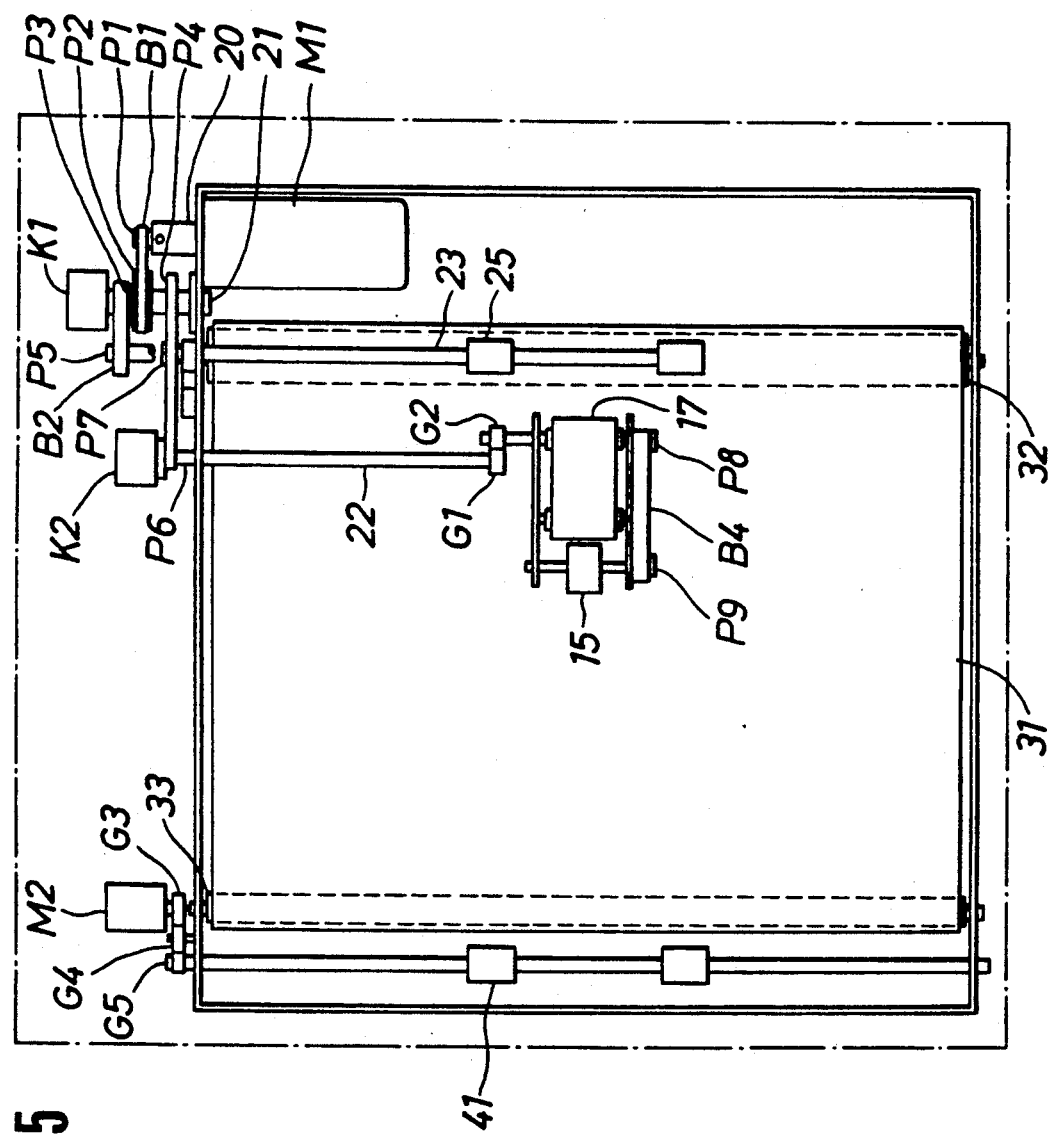
FIG. 5 is a plan view of the main elements of the automatic document conveying device.

Next, the abovementioned roller group and the power drive system will be explained with reference to FIG. 3, FIG. 4, and FIG. 5.

The drive motor M1 is an integrated servomotor comprising a DC motor and a speed control device (an encoder or a tachometer generator, or the like). A toothed belt B1 is fitted between a toothed pulley PI integrated with a drive shaft 20 of the drive motor M1 and a toothed pulley P2 secured to a countershaft 21, and rotated from the drive rotation of the motor M1.

In addition to the toothed pulley P2, a pair of toothed pulleys P3, P4 and the magnetic clutch K1 are fitted to the countershaft 21. A toothed belt B2 runs between the toothed pulley P3 and a toothed pulley P5 secured on the end of the shaft of the conveyor belt drive roller 32.

The follower roller 33 is rotated by the conveyor belt drive roller 32, via the conveyor belt 31.

In addition, a toothed belt B3 which is engagingly positioned around the toothed pulley P4 provided on the countershaft 21, is also engagingly positioned around a toothed pulley P6 fitted onto a feed roller shaft 22 which rotates the feed roller 16A via a pair of gears G1, G2, and around an outer peripheral toothed section of a toothed pulley P7 fitted to a conveyor roller countershaft 23 which integrally comprises an intermediate conveyor roller 25. Also, a pair of tension rollers R1, R2 are circumscribed and firmly contacted under tension by the outer peripheral surface of the toothed belt B3.

By the movement of the belt B3, the feed roller shaft 22, which is integrally combined with the toothed pulley P6, rotates the feed roller 16A via the gears G1, G2. As a result, the feed belt 17 which encloses the follower roller 16B moves, which causes the rotation of the pick-up roller 15 through the toothed pulleys P8, P9 and the toothed belt B4. The magnetic clutch K2 is mounted on the other end of the feed roller shaft 22 and is controlled through an input signal so that the feed belt 17 and the pick-up roller 15 rotate to feed the document.

A paper discharge section 40 is provided on the conveyor downstream side of the follower roller 10. A paper discharge roller 41 is axially supported in a freely rotatable manner. Power is transmitted to the paper discharge roller 41 from a drive motor M2 through a plurality of gears G3, G4, G5. A follower roller 41A rotates from pressure applied by the paper discharge roller 41.

When a copy is made on both sides of the document, following the exposure of the first side by the process outlined above and synchronous with the completion of the exposure process, the conveyor belt drive roller 32 begins to rotate in the counterclockwise direction so that the document is conveyed to the right on the document table glass 101 by the conveyor belt 31. The right side of the conveyed document is fed into the document reversal section 50. Accordingly, the document D in the document reversal section 50 follows the guide plate 54 and is interposedly maintained by the conveyor rollers 51, 52, 53 in sequence. Subsequently, the right end of the document D, specifically the front end in this case, is discharged onto the document table glass 101. Prior to this, the front end of the document, based on a signal from the reversed document passage sensor PS5, causes the conveyor belt drive roller 32 to be switched, to once again rotate in the clockwise direction.

In the foregoing a simplified configuration was used for the drive system in which power was transmitted from the drive motors M1, M2. Next, the operation of the drive system will be explained. FIG. 6B, and FIG. 6C are transverse views illustrating the document feed and conveying process; FIG. 7 is a view showing the rotational speed of each paper feed roller by means the drive system; FIG. 8 is a block diagram of the drive system; FIG. 9A and FIG. 9b together show a time chart covering the automatic conveying of three documents. This process is completely under the control of a CPU.

(1) A stack of documents is loaded onto the document loading table 11. When this stack contacts the document front end stopper 12, which is in the elevated position, the document set sensor PS2 detects the presence of the documents and is set in the ADF mode.

(2) The width regulation plate 13 is moved to contact the side edge of the document stack, whereupon the document size sensor PS1 determines the width of the document from which the CPU calculates the document length and records this data.

(3) When the COPY button is depressed, a copy start signal is input. The main copying machine 100 and the automatic document conveying device are started.

A plurality of clock timers $t_5$, $t_6$, $t_7$, $t_8$, $t_9$, $t_{10}$ are started simultaneously by the ADF start signal. The clock timers $t_6$, $t_7$ set the document stopper solenoid SD3, and the clock timers $t_5$, $t_{11}$ reset the solenoid SD3. The clock timer $t_8$ generates an OFF signal for the conveyor clutch K1 and a start signal for the drive motor M2. The clock timers $t_9$, $t_{10}$ control the ON and OFF states of the drive motor M1.

(4) The ADF start signal causes a voltage to be applied to the document set solenoid SD1 and the front end of the document front end stopper 12 drops down. A voltage is simultaneously applied to the document feed solenoid SD2 so that the pick-up roller 15 descends and applies pressure to the uppermost layer of the document stack.

(5) Simultaneously, when the drive motor M1 starts up, the toothed pulley P1 on the motor drive shaft 20 rotates and causes the countershaft 21 with the toothed pulley P1 to rotate via the toothed belt B1. At this time, the magnetic clutches K1, K2 are both activated, the feed roller shaft 22 is rotatably driven by means of the toothed belt B3, and the feed belt 3 is caused to move via the feed roller 16A. The pick-up roller 15 is also rotatably driven by the toothed belt B4. Simultaneously, the toothed pulley P7 which engages the toothed belt B3 also rotates, the conveyor roller countershaft 23 rotates, and the intermediate conveyor roller 25 is caused to rotate.

In addition, simultaneously with the above actions, the toothed belt B2, which is positioned around the countershaft 21, causes the conveyor belt drive roller with the toothed pulley P5 to drive the conveyor belt drive pulley 32. This action causes the conveyor belt 31 which runs between the roller 32 and the follower roller 33 to be activated. At this time, the peripheral speeds of the pick-up roller 15, the feed belt 17, the intermediate conveyor roller 25, and the conveyor belt 31 are all the high speed conveyor mode $v_1$ (for example, the peripheral speed $v_1 = 1200$ mm/sec).

From the rotation of the abovementioned rollers and the movement of the belts, the uppermost document D1 in the document stack on the document loading table 11 is conveyed out by the pick-up roller 15, and is moved out by the feed belt 17 and the double-feed prevention roller 18, so that the one uppermost document D1 is separated and fed out.

(6) When the front end of the separated and fed document D1 passes the document passage sensor PS3 a front end passage signal is generated which starts a block timer. The paper feed clutch K2 is deactivated after the time on the timer $t_3$ has elapsed. This causes the front end of the document D1 to pass the nip position by means of the intermediate conveyor roller 25, then the drive rotation of the pick-up roller 15 and the feed belt 17 is halted and driven rotation commences.

(7) The intermediate conveyor roller 25 continues to be drivenly rotated and feeds the document D1 which passes the document passage synchronized sensor PS5, then the document D1 is interposedly pressed by the moving conveyor belt 31 and slides along the document table glass 101.

(8) When the time on the timer $t_6$ has elapsed after the document passes the synchronized sensor PS5, the document stopper solenoid SD3 is activated and the document stopper 102 projects from the left end of the upper surface of the document table glass 101. The solenoid SD3 is the latch type, therefore, as long as it is not reset, it remains in the attracted state, even when the power is cut.

(9) Prior to the time that the front end of the document reaches the document stopper 102, specifically, when the time on the timer $t_9$ has elapsed after the document has passed the synchronized sensor PS5, the drive motor M1 is temporarily turned OFF, the brake is applied, and the drive motor M1 is halted. However, from inertia, to some degree each of the drive sections continues to be activated, and the conveying of the document also continues. The method of shorting both terminals of the motor M or applying a reverse voltage or the like is effective in operating this motor brake.

(10) After this, when the time on the timer $t_8$ has almost elapsed, the conveyor clutch is turned OFF and the conveyor belt 31 is controlled so that it comes to a halt. However, here also, as the result of inertia the conveyor belt 31 advances while losing speed, but the document stops on contact with the document stopper 102.

Almost simultaneously with the elapsing of the time on the timer $t_8$, the clock is switched from high speed to low speed.

(11) With the document in a state of repose in the image exposure section (document table glass 101) scanning and exposure is commenced by an optical system 103 in the main copying machine 100.

(12) After the time on the timer $t_{10}$ has elapsed, the paper feed clutch K2 is activated and the drive motor M1 runs. This causes the pick up roller 15 and the feed belt 17 to initiate the feeding of the next document D2.

The next document D2 is fed out during the preceding scanning and exposure operation through the action of the feed belt 17 and the intermediate conveyor roller 25. When the front end of the next document D2 passes the document passage sensor PS3, a sensing signal is generated and at a time t on the block timer (or a pulse count by a counter) the document D2 halts at a specified position S on standby. The position S at which the front end of the document D2 halts is on the upper surface of the document table glass 101. A timer or a pulse count is set from a position where pressure is applied by the document presser roller 34A, close to the document feed inlet in the upstream side paper feed direction. In this interval the paper feed magnetic clutch K2 is activated and the conveyor magnetic clutch K1 is deactivated, so that during the exposure process the preceding document D1 is halted, and at this time the succeeding document D2 is fed at a low speed conveying mode $v_2$. When the front of the document D2 reaches the standby position S close to the document table glass 101, the document halts temporarily. However, a speed $v_2$ (for example, $v_2 = 500$ mm/sec) is determined so that the action during this period, at least after completion of the scanning, is completed prior to a restart signal being generated.

The succeeding document standby position S is set differently for documents of different sizes, specifically, for the length in the document conveying direction.

FIG. 6B is a transverse view showing the paper feed and conveying process for the preceding document D1 and the succeeding document D2.

Timing by means of a clock timer commences from the time the front end of the succeeding document D2 has passed the document passage sensor PS3. After the time on the timer $t_2$ has elapsed, the paper feed clutch K2 is deactivated and the paper feed stops. Next, after the time on the clock timer $t_{14}$ has elaspsed, and the front end of the document D2 has passed the document synchronizing sensor PS5, the drive motor is halted. Then, the front end of the document D2 at the standby position S is at a position where no pressure is applied on the conveyor belt 31 close to the document table glass 101, so that the document D2 approaches within a short distance of the rear end of the preceding document.

(13) Next, when the scanning and exposure operation is completed, an ADF start signal is generated by the main copying machine 100 and the discharge of the first document D1 and the feed operation of the second document D2 are carried out. Specifically, the drive motor M1 is turned ON, the conveyor magnetic clutch K1 is activated, and the preceding document D1 is conveyed by the conveyor belt 31 and fed to the paper discharge section 40. At the same time, the drive motor M2 is also turned ON and the paper discharge roller 41 is rotatably driven. From the pressure applied by the rotation of the follower roller 41A, the preceding document D1 is conveyed toward the paper discharge tray 42. Also at the same time, the succeeding document D2 is moved from the standby position S at the high speed mode $v_1$, interposedly maintained by the document table glass 101 on which it slides, and the conveyor belt 31, which moves from pressure applied on the document table glass 101 by the document presser rollers 34A, 34B, 34C. In the same manner as in the abovementioned halting operation, the document D2 reaches the document stopper 102 and the document change is completed.

At this time, the document is conveyed at the high speed conveyor mode $v_1$, timed by the clock timer $t_8$. After the time on the timer $t_8$ has elapsed, the conveyor speed is switched to the low speed conveyor mode $v_2$. Also after the time on the timer $t_8$ has elapsed, the conveyor clutch K1 is deactivated, and, simultaneously, the paper discharge drive motor M2 is switched to the low speed $v_3$, the exposure action is commenced, and the preceding document D1 is discharged to the discharge tray 42 at low speed. When the rear end of the preceding document D1 passes the document discharge sensor PS4, based on this detection signal, after the time required for the document D1 to pass the paper discharge roller 41, the timer $t_{15}$ commences timing and the drive motor M2 is turned OFF. At this time, during the discharge of the document D1, the low speed $v_3$ of the motor M2 is set so that the discharge action is completed before the exposure of the first sheet of the next document D2 is completed.

In this embodiment of the present invention, the drive systems for three operating systems—paper feed, conveying, and paper discharge—are operated and controlled with two motors, M1 and M2, and two magnetic clutches K1 and K2. However, it is possible to carry out the same operation with three motors and one magnetic clutch. Another possible combination is one motor and three clutches.

Also, when both surfaces of the document are to be copied, the document is turned over and returned to the document reversal section 50. In the case where the document is once again conveyed to the document table glass, the time commences from when the document is detected passing the reversed document passage sensor PS5. In the same way as outlined above, if the temporary halt position S is set for the document, the same effect is obtained.

Furthermore, in this invention, during the scanning and exposure of the document, when the discharge of the preceeding document is completed, the feed start standby of the next document is controlled and carried out so that these copy modes are set for a large document which requires time in scanning and exposure, and in the case of multicopy mode. Both low speed paper feed and paper discharge are possible from CPU control. As a result, the improvement in stability of separation performance when the document is fed, prevention of damage to the leading edge of the document, stabilizing of document travelling performance, and prevention of scattering of documents on discharge, become even more effective.

Next, another embodiment of the automatic document conveying device of the present invention will be explained with reference to FIGS. 10 to 21.

FIG. 10 is a configuration diagram showing the conveying path of the document for the automatic document conveying device of the present invention. FIG. 11 is an external perspective view of the automatic document conveying device mounted on a photocopying machine. FIG. 12 is a configuration diagram showing the drive system (power transmission system) for the automatic document conveying device. FIG. 13 is a transverse view of the overall drive system configuration of the device. FIG. 14 is a transverse view of the conveying path of the document when both sides of the document are being copied. The device illustrated in these drawings is an automatic document conveying device with a document reversing function (RADF). The structure and operation of the automatic document conveying device will now be explained with reference to these drawings.

The automatic document conveying device (RADF) of the present invention is installed on a main copying machine 201, as shown in FIG. 10 and FIG. 11, and comprises a paper feed section 210 from which one document from a document stack loaded on a document tray 211 is fed onto a document table glass 202; a conveyor section 220 which conveys the document supplied from the paper feed section 210 to a specified position (image scanning and exposure position) on the document table glass 202 on a document table; and a document discharge section 230 which discharges the document fed from the document conveyor section 220 after completion of the image exposure process, to a paper discharge tray 239.

First, the drive system will be explained with reference to FIG. 12 and FIG. 13. A drive motor M is positioned in the center, while a feed section 210 on the right side, a conveyor section 220 in the center, and a document discharge section 230 on the left side of this drawing make up the drive system. The motor M as the drive source causes a pair of toothed pulleys P10, P11 to rotate, via a pair of gears G0, G6. Power for the paper feed section 210 and the document discharge section 230 is taken off by means of a toothed belt B6 and a toothed belt B7 respectively.

The drive transmission system branching to the right of the drawings drives a feed roller 215B used for belt separation for the paper feed section 210, and an intermediate conveyor roller 218, as well as a drive roller 222 for a conveyor belt 221 in the conveyor section 220, via a gear train G7, G8, G9, G10, G11. A clutch K3 is built into a gear G11 fitted to the end of a shaft for the feed roller 215A. The clutch K3 is idle except during paper feed.

The drive transmission system taken off to the left of the drawing via the belt B6 from the pulley P10 drives a paper discharge reversing roller 231 through a pair of pulleys P13, P14, and a pair of gears G12, G13. A unidirectional clutch K4 is provided on the gear G14, and a unidirectional clutch K5 is provided on the gear G12. The paper discharge reversing roller 231 and a paper discharge roller 235 are always unidirectionally rotated in the direction indicated by the arrows, unrelated to the direction in which the motor M is turning.

The automatic document conveying device of the present invention shown in the transverse view, FIG. 14, is capable of providing a two-sided copy, covering both sides of a document. On completion of the customary one-sided copy passing through the same conveyor path, and of exposure and copying of the first side, the document D is conveyed along the path in the direction indicated by the arrows Z1, Z2. Then, without being discharged, the document D is turned over and conveyed via the paper discharge reversing roller 231 and a pair of pinch rollers 232, 233 along the reverse path in the direction indicated by the arrows Y1, Y2. The document D is then once again sent back to the document table glass 202 for exposure and copying of the second side (underside). After exposure and copying, the document D once again is conveyed along the path in the direction indicated by the arrows Z1, Z2, and this time is discharged onto the discharge tray 239 by the discharge roller 235, via the paper discharge reversing roller 231 and the pinch rollers 232, 233, along the path indicated by the arrow Z3 as indicated in the drawing. The document loading table 211, on which stacks of documents can be loaded, is provided on the upper right of the surface of the paper feed section 210 of the automatic document conveying device. On the front end downstream side of the document loading table 211, as shown in FIG. 10, a solenoid SD3, a movable guide plate 212 which can be swung by means of the solenoid SD3, and a document front end stopper 213 are provided.

When the stack of documents has been loaded on the document loading table 211, the presence of the documents on the document loading table 211 is detected by a document set sensor (a sensor which determines when the number of documents is zero) PS6, and the RADF mode is indicated on the control panel on the main copying machine 201.

A width regulation plate 214 for regulating the documents in the direction of their width is movably provided on the document loading table 211.

On the document feed downstream side of the document loading table 211, a feed belt 216 is provided which encloses and causes a feed roller 215A and a follower roller 215B to rotate. A paper feed separation means, comprising a double-feed prevention roller 217, is positioned below the feed belt 216. This paper feed separation means is driven by the motor M by power transmitted through the magnetic clutch K3.

The automatic document conveying device is started by operating the COPY button on a control panel 203 of the copying machine 201 so that power is applied to the paper feed solenoid SD3. The front end of the movable guide plate 212 linked to the solenoid SD3 is dropped down to press the stack of documents to the surface of the feed belt 216. At the same time the documents are sent forward by the feed belt 216 which begins to move from the drive power provided by the drive motor M. The fixed double-feed prevention roller 217 ensures that only the uppermost sheet of the document D from the plurality of sheets in the stack is separated out and sent forward. At this time the double-feed prevention roller 217 prevent the underlayers which follow the first document sheet from advancing.

A document passage sensor (document size sensor) PS7, an intermediate conveyor roller 218, and a pair of curved guide plates 219 are provided on the document feed downstream side of the paper feed separating means. The second clutch K4 is activated and the document D is conveyed to the nip of the intermediate conveyor roller 218. When the front end of the document intersects the sensor PS7, the first clutch K3 driving the feed roller 215A is deactivated and the feed belt 216 proceeds between the drive shaft and the unidirectional clutch engaging the feed roller 215A until the document D is cleared, then halts.

The passage of the front end of the one sheet of the document fed out by the paper feed separating means is detected by the document passage sensor PS7, and when the sensor PS7 is activated a first timer TM1 begins counting. Next, the document is fed by the adjacent pair of intermediate conveyor rollers 218, passes through the guide plates 219, and is fed toward the document table glass 202. The document D is interposedly conveyed between the document table glass 202 and a conveyor belt 221 which moves at almost the same speed as the peripheral speed of the intermediate conveyor rollers 218. When the count on the first timer TM1 has been completed the third clutch K5 driving the conveyor belt 221 is deactivated, a brake BK is engaged, and the document D contacts a document stopper 205 projecting outward at the end of the document table glass 202 on the discharge side, then halts.

The length of the document is determined by the detection of the passage of the rear end of the document by the sensor PS7. The sensor PS7 also detects paper jams in the paper feed section 210.

The conveyor belt 221 passes around a conveyor belt drive roller 222, a follower roller 223, a pair of document presser rollers 224, 225, and a movable pressure roller 226 by which pressure can be applied or released. The conveyor belt 221 can be driven in the forward or the reverse direction by the motor M.

The lower running surface of the conveyor belt 221 is pressed against the surface of the document table glass 202 by the document presser rollers 224, 225, and the movable pressure roller 226.

The length of the document D is measured by the time taken from the passage of the front end of the document to the passage of the rear end of the document as detected by the sensor PS7. Three types of modes can be set from the ranges in the following three classifications. For the document length L:

$$L1 > L > L3 \tag{i}$$

$$L2 > L > L1 \text{ or } L3 > L \tag{ii}$$

$$L > L2 \tag{iii}$$

where L1 is the length from the document stopper 205 to the document presser roller 225; L2 is the length from the document stopper 205 to the movable pressure roller 226; and L3 is the length from the document presser roller 225 to the intermediate conveyor roller 218.

The relationship between these distances and the positioning of the main document conveying members will now be explained with reference to FIG. 15.

(i) In the case where $L1 > L > L3$

The front end of the document D5 contacts the document stopper 205 and halts. The movable pressure roller 226 is elevated from the position indicated by the broken line to the position indicated by the solid line in the drawing, by a solenoid which has been omitted from the drawing. As a result, the configuration of the conveyor belt 221 is changed from the configuration under tension as indicated by the broken line in FIG. 15 to the state indicated by the solid line. The conveyor belt 221 between the document presser roller 225 and the movable pressure roller 226 is elevated, causing a gap to be created between the belt 221 and the document table glass 202. At the same time, the follower roller 223 of the conveyor belt 221 is also externally placed under tension from the pressure from a spring 223a, and the slack in the conveyor belt 221 is taken up by the movement of the movable pressure roller 226.

The document D5 in the halt position on the document table glass 202, is exposed by a exposure lamp 206 (see FIG. 10) in the main copying machine 201, and a document image is formed on a recording member by scanning with a scanning exposure section comprising a lens, mirrors, and the like.

At the same time as the exposure commences, the first clutch K3 and the second clutch K4 are activated, and the next document D6 is fed out. When the front end of the document D6 intersects the sensor PS7, a second timer TM2 starts its count. The second timer TM2 is provided to count the time taken for the front end of the document D6 to pass the movable pressure roller 226 and reach the document presser roller 225. When the count of the second timer TM2 is completed, the second clutch K4 of the intermediate conveyor roller 218 is deactivated and the brake is engaged. The front end of the document D6 halts between the document presser roller 225 and the movable pressure roller 226, and enters the standby state. This action is designed to be completed before the exposure of the set number of sheets of the document D5 has been completed.

FIG. 16 is a transverse view showing the standby state of the document D6 subsequent to the stoppage and exposure of the preceding document D5. L is the length of the document; $d_1$ is the interval from the rear end of the preceding document D5 to the front end of the next document D6; $d_2$ is the distance (discharge distance) from the document stopper 205 to the discharge roller 235.

Next, when the exposure of the set number of sheets of the document D5 is completed, the clutch K4 and the clutch K5 are activated, and the document D5 is fed out. At the same time, the next document D6, which has been halted in the standby state, is conveyed onto the document table glass 202 and comes in contact with the document stopper 205. At this time, as opposed to the the necessary distance $(d_1+L)$ for the next document D6 to be conducted and halted, the necessary distance for the preceding document D5 to be completely discharged is $(L+d_2)$, but when $$(d_1+L)<(L+d_2)$$

during the paper discharge process, the document comes to a halt. However, when $$(d_1+L)>(L+d_2)$$

or specifically, when $d_1>d_2$, then $d_1$ and $d_2$ must be set.

However, as shown in FIG. 10, with a configuration in which the document D is exposed, then reversed and discharged for loading onto the upper surface of the automatic document conveying device, the above discharge distance $d_2$ is large, and, accordingly, the interval $d_1$ must be large. For this reason, the document change time for the next document D6 to be conveyed from the standby position to the stop position of the document stopper 205 is long.

In the automatic document conveying device of the present embodiment even after the clutch K5 is deactivated and the brake BK is applied, the paper discharge reversal roller 231 continues to turn, and a fixed time after the rear end of the document D has intersected a sensor PS8, a solenoid SD6 is activated. By applying pressure with a pressure lever 234 on the paper discharge roller 235 being rotated at low speed by the paper discharge reversal roller 231, pressure is applied to the interposed document D which is then discharged at low speed. The speeds are determined so that this discharge action is completed before the next document has been copied.

(ii) In the case where $L2>L>L1$ or $L3>L$:

FIG. 17 is a transverse view showing the conveying of documents of this size.

As opposed to (i) above, the movable pressure roller 226 remains lowered, and the temporary standby position of the front end of the next document D6 is set between the movable pressure roller 226 and the intermediate conveyor roller 218.

In the case where L, the length of the document, is less than L3 (the length from the nip position of the intermediate conveyor roller 218 to the pressure position of the document presser roller 225), if, as in (i), the movable pressure roller 226 is elevated, the pressure on the document table glass 202 between the two rollers 218, 226 becomes zero so that the document conveying force is reduced and there is a tendency for unsatisfactory conveying to occur. For this reason, it is necessary to leave the movable pressure roller 226 in the nonelevated state.

(iii) In the case where $L>L2$:

FIG. 18 is a transverse view showing the conveying of documents of this size.

In this case, the standby position is located before the glass; or, the next document D6 does not standby and is fed synchronously with the discharge of the previous document D5 from the standby position before the glass; or, the next document D6 is fed out from the nip position of the double-feed prevention roller 217 in the paper feed section 210. After the next document D6 is stopped at the document stopper 205, during the exposure operation, the previous document D5 is discharged at slow speed.

From the foregoing explanation, it is seen that the length of the document is determined by the document passage sensor PS7, and the width of the document is determined from the amount of movement of the width regulation plate 214 on the document loading table 211. The control of the vertical movement of the movable pressure roller 226 can be set in advance. In addition, the document size may be also be manually input to memory.

FIG. 19 is a perspective view showing one embodiment of the drive device for the movable pressure roller 226.

At both ends of the shaft of the follower roller 223 a pair of tension members 223A, 223B are provided, each energized by a spring. The tension members 223A, 223B can move parallel to the direction of the document flow, along elongated grooves which are omitted from the drawing. The conveyor belt 221 enclosing the drive roller 222 and the follower roller 223 is maintained under tension with no slack by the tension members 223A, 223B.

The two ends the shaft of the movable pressure roller 226 are supported by a pair of arms 228A, 228B. The arm 228A and the arm 228B are integrally formed with a support shaft 229A and a support shaft 229B respectively and supported in a freely swinging manner. An arm 229C is integrally mounted on the support shaft 229B. A plunger on a latch-type solenoid SD5 is connected to the other end of the arm 229C in a freely rotatable manner. The support shafts 229A, 229B are engaged by a bearing 229D and a bearing 229E respectively and are supported in a rotatable manner.

When power is applied to the solenoid SD7 and the plunger is retracted, the arm 229C centered around the support shaft 229B rotates in the counter clockwise direction and the arms 228A, 228B move together and rotate around the support shaft 229B. The movable pressure roller 226 swings upward, and separates from the inside surface of the conveyor belt 221 so that the pressure on the conveyor belt 221 is released. The slack produced in the conveyor belt at this time is taken up by the energization of the springs on the the tension members 223A, 223B.

When the retraction of the solenoid SD7 is released and the plunger returns to its original position, the movable pressure roller 226 descends of its own weight against the energization of the springs, and pressure is applied to the inside surface of the conveyor belt 221 which is pressed against the upper surface of the document table glass 202.

FIG. 20 is a perspective view showing another embodiment of the drive device for the movable pressure roller of the present invention.

A special feature of this embodiment is that the follower roller 223 is supported in a freely rotatable manner in a fixed position, and the slack in the conveyor belt 221 produced in correspondence to the vertical movement of the movable pressure roller 226 is cancelled by means of a tension roller 227A linked to the movable pressure roller 226. An arm 228C which supports one end of the movable pressure roller 226, and a corresponding arm 228D which supports the other end are provided in a freely swinging manner on the support shafts 229A, 229B respectively. The tension roller 227A is supported in a freely rotatable manner on the other ends of the arms 228C, 228D. The support shaft 229B which is integrally formed with the one arm 228D is rotatably driven by the solenoid SD7 in the same manner as in the previous embodiment. When the solenoid SD7 is activated the arms 228C, 228D are rotated in the counterclockwise direction, and the movable pressure roller 226 separates from the lower inside surface of the conveyor belt 221, while the tension roller 227A applies pressure to the upper outside surface of the conveyor belt 221.

FIG. 21 is a perspective view showing yet another embodiment of the drive device for the movable pressure roller of the present invention.

An arm 228E which supports one end of the movable pressure roller 226, and a corresponding arm 228F which supports the other end are provided in a freely swinging manner on the support shafts 229A, 229B respectively. A tension roller 227B is supported in a freely rotatable manner at a center position of the arms 228C, 228D. The lower end of the arm 229C secured to the other end of the support shaft 229B which is integrally formed with the one arm 228F is connected to the plunger of the solenoid SD7.

When the solenoid SD7 is activated the arms 228E, 228F are swung in the counterclockwise direction, and the movable pressure roller 226 separates from the lower inside surface of the conveyor belt 221, while the tension roller 227A presses up against the upper inside surface of the conveyor belt 221 to take up the slack.

As outlined in the foregoing explanation, by means of the automatic document conveying device of the present invention, not only is it possible to shorten the document conveying time, but by running at slow speed when feeding the document the stability of the separation performance is improved, conveying of documents is smoother, and prevention of damage to the leading edge of the document is even more effective. In addition, because usually more than three documents are not in motion, the motor load is reduced and considerable power is saved, making it possible to utilize a small, low torque motor with noise suppression on the device.

In particular, document conveying is based on an ADF start signal from the main copying machine, which starts the motors, clutches, solenoids, and various timers, and control is in response to an optical scan, so that a control program is simple and uncomplicated. There are few factors to cause operational errors, and production losses are greatly reduced.

In addition, the discharge operation is also independent and performed at low speed, so that alignment of the discharged documents is stabilized. Because less than three documents are in motion at any one time, jam control is also simplified.

In the case where low speed is not used, copy productivity, specifically, the ratio:

$$\frac{\text{number of documents conveyed per minute in the } ADF}{\text{number of copies per minute in the copying machine}}$$

can be improved.

What we claim is:

1. An automatic document conveying device comprising:
    a document-feed means for sequentially transporting one document sheet from a stack of document sheets loaded on a document loading table to a selected one from a plurality of different standby positions and for halting each document sheet at the selected standby position;
    a conveyor belt for conveying the document sheet along a document conveying path to an exposure position on an image exposure section of a document table glass, for halting the document sheet at the exposure position, and for removing the document sheet from the exposure section, a document presser roller, at least one movable pressure roller rotatably positioned inside the conveyor belt on an upstream side of the document conveying path, and drive means for driving said movable pressure roller between a lowered pressing position where it is pressed against a glass surface of the document table glass and a raised position where it is separated from the glass surface of the document table glass;
    a detecting means for detecting a size of each document sheet;
    a document discharge means, arranged on an opposite side to the document feed means with respect to the conveyor belt and contiguously to the exposure position, for discharging each document sheet after each document sheet is scanned and exposed by the image exposure section; and
    a control means coupled to the detecting means for controlling the document-feed means to halt each document sheet at the selected standby position which is selected in response to the detected size of each document sheet, where a front end of the document sheet lies on the document table glass and a rear end of the document is positioned in the document feed means, said control means controls the drive means to drive said movable pressure roller from said raised position to said pressing position when a next document sheet waiting at its selected standby position has a shorter length than the distance between said document presser roller and said document-feed means;
    wherein each document sheet is halted at the exposure position for exposing based on the front end of the document sheet, wherein said control means controls the document-feed means to start conveying a third document sheet to its selected standby position at least before scanning and exposure of a second document sheet at the exposure position is completed.

2. An automatic document conveying device comprising:
    a document-feed means for sequentially transporting one document sheet from a stack of document sheets located on a document loading table to a conveyor means;
    the conveyor means being arranged downstream of the document-feed means, and including means for conveying the document sheet to a standby position selected from a plurality of different standby positions of the document sheet and for conveying the document sheet from the selected standby position toward an exposure position on the image exposure section on a document table glass;
    a conveyor belt means for conveying each document sheet conveyed from the selected standby position by the conveyor means to the exposure position, and for halting the document at the exposure position, wherein said conveyor belt means includes a document presser roller, at least one movable pressure roller rotatably positioned inside the conveyor belt means on the upstream side of the conveyor belt means, and drive means for driving said movable pressure roller both to be pressed against the glass surface of the document table glass and to be separated from the glass surface of the document table glass, wherein said movable pressure roller, when separated from the glass surface of the document table glass, is moved onto the glass surface in case a next document sheet waiting at the standby position has a shorter length than the distance between said document presser roller and said conveyor means;

a detecting means for detecting a size of the document;

a document discharge means arranged on an opposite side to the conveyor means with respect to said conveyor belt means and contiguously to the exposure position for discharging each document sheet after each document sheet is scanned and exposed by the image exposure section; and a control means for controlling the conveyor means to convey the document sheet to the selected standby position, which is selected in response to the detected size of each document sheet where the front end of the document lies on the document table glass and the rear end of the document is positioned upstream of the conveyor means, wherein said control means includes means for controlling the document-feed means and the conveyor means to start conveying a third document sheet to the standby position at least before the scanning and exposure of the second document sheet at the exposure position is completed.

* * * * *